(12) United States Patent
Gwengo et al.

(10) Patent No.: US 11,680,180 B2
(45) Date of Patent: Jun. 20, 2023

(54) E-TEXTILES FABRICATED USING PARTICLE-FREE CONDUCTIVE INKS

(71) Applicant: Liquid X Printed Metals, Inc., Pittsburgh, PA (US)

(72) Inventors: Chengeto Gwengo, Beaver Falls, PA (US); Robert G. Swisher, Pittsburgh, PA (US); Christianna M. Petrak, Brackenridge, PA (US)

(73) Assignee: LIQUID X PRINTED METALS, INC., Pittsburgh, PA (US)

( * ) Notice: Subject to any disclaimer, the term of this patent is extended or adjusted under 35 U.S.C. 154(b) by 1103 days.

(21) Appl. No.: 16/275,161

(22) Filed: Feb. 13, 2019

(65) Prior Publication Data

US 2019/0249026 A1   Aug. 15, 2019

Related U.S. Application Data

(60) Provisional application No. 62/745,710, filed on Oct. 15, 2018, provisional application No. 62/674,864,
(Continued)

(51) Int. Cl.
*C09D 11/52* (2014.01)
*C09D 11/322* (2014.01)
(Continued)

(52) U.S. Cl.
CPC ............ *C09D 11/52* (2013.01); *B41M 3/006* (2013.01); *B41M 5/0047* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538;
(Continued)

(56) References Cited

U.S. PATENT DOCUMENTS 5,716,663 A   2/1998   Capote et al.
6,605,483 B2  8/2003   Victor et al.
(Continued)

*Primary Examiner* — Manish S Shah
(74) *Attorney, Agent, or Firm* — Dentons Cohen & Grigsby P.C.

(57) ABSTRACT

Described herein are methods for forming e-textiles, wherein the methods include printing a particle-free conductive ink on a textile substrate, and curing the textile substrate to produce a conductive pattern thereon. The printing may include inkjet printing and may produce a printed pattern which exhibits an ink bleed of less than 0.5 mm, such as less than 0.2 mm. During printing, the textile substrate may be heated to a temperature of 30° C. to 90° C. before and during the printing process. The fabric substrate may be cured using heat and/or light to produce a conductive pattern having a sheet resistance of less than 10Ω/□, or even less than 1Ω/□.

21 Claims, 13 Drawing Sheets

Related U.S. Application Data filed on May 22, 2018, provisional application No. 62/630,005, filed on Feb. 13, 2018.

(51) Int. Cl.

| | | |
|---|---|---|
| *C09D 11/037* | (2014.01) | |
| *B41M 3/00* | (2006.01) | |
| *H05B 3/34* | (2006.01) | |
| *B41M 5/00* | (2006.01) | |
| *B41M 7/00* | (2006.01) | |
| *C09D 11/033* | (2014.01) | |
| *C09D 11/38* | (2014.01) | |

(52) U.S. Cl.
CPC .......... *B41M 7/009* (2013.01); *C09D 11/033* (2013.01); *C09D 11/037* (2013.01); *C09D 11/322* (2013.01); *C09D 11/38* (2013.01); *H05B 3/342* (2013.01)

(58) Field of Classification Search
CPC .............. B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | |
|---|---|---|
| 9,817,440 B2 | 11/2017 | Longinotti-Buitoni et al. |
| 10,071,565 B2 | 9/2018 | Hu et al. |
| 2002/0013013 A1* | 1/2002 | Victor ............... B41M 1/12 438/57 |
| 2003/0148024 A1* | 8/2003 | Kodas ............... C23C 18/08 106/1.23 |
| 2006/0001726 A1* | 1/2006 | Kodas ............... C23C 18/08 347/105 |
| 2013/0236655 A1* | 9/2013 | Nasu ............... H01F 41/16 427/559 |
| 2013/0236656 A1* | 9/2013 | Mccullough ......... C09D 11/322 427/532 |
| 2014/0377454 A1 | 12/2014 | Iftime et al. |
| 2015/0125596 A1 | 5/2015 | Ramakrishnan et al. |
| 2019/0023030 A1 | 1/2019 | Hu et al. |

\* cited by examiner

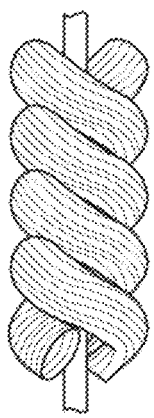
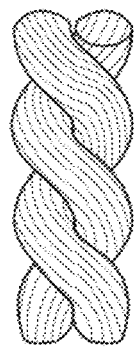
FIG. 1A
PRIOR ART
FIG. 1B
PRIOR ART
FIG. 1C
PRIOR ART
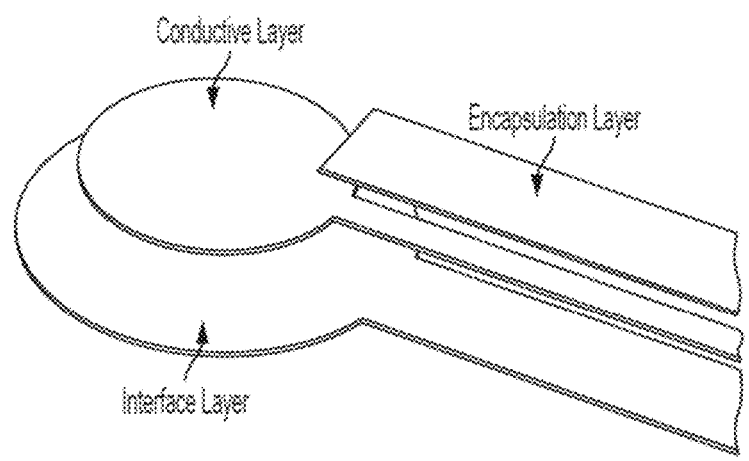
FIG. 2
PRIOR ART

E-TEXTILES FABRICATED USING PARTICLE-FREE CONDUCTIVE INKS

CROSS-REFERENCE TO RELATED APPLICATIONS

The present application claims the benefit under 35 U.S.C. § 119(e) of prior U.S. Provisional Application Ser. No. 62/630,005, filed Feb. 13, 2018; 62/674,864, filed May 22, 2018; and 62/745,710, filed Oct. 15, 2018, the entire contents of which are incorporated herein.

TECHNICAL FIELD

This invention pertains generally to methods for printing particle-free conductive inks on textiles and e-textiles having conductive patterns printed thereon.

BACKGROUND

Electronic textiles ("e-textiles") are known and used as wearable technologies that provide electronic elements built directly into the textile, such as into an article of clothing. E-textiles have a wide variety of uses in the fields of biomedicine, sports, military, and energy harvesting. Known e-textiles are not without disadvantages however. For example, elements of the wearable devices are typically connected by cables and various connectors which can be snagged or may interfere with normal use of the fabric or garment. Additionally, the various components of the e-textiles are often not easily cleaned.

Knitting, weaving, and embroidery of conductive threads have been used to solve some of these problems, but such solutions are generally not scalable or easy to manufacture. Moreover, these fabrics tend to be rough and/or porous due to incorporation of the conductive threads. Conductive metal coatings and screen printing have also been used to incorporate conductive patterns on textiles, with some difficulties related to achieving a continuous conductive path on differing textile substrates.

Printed electronics is one of the fastest growing technologies in the world, providing integration of complex electronic functionality into a wide range of products. Inks and methods of printing those inks on textiles has, however, lagged behind. Suitable inks are essential for the manufacture of these printed electronics, with conductive inks considered the most important materials for a variety of electrodes (including transparent electrodes). In general, electronic inks composed of conductive metal nanoparticles are used to print (or coat) a substrate using a range of printing systems, such as a gravure printing, flexographic printing, (rotary) screen printing, offset printing, gravure-offset printing, microdispersion, direct write printing, or (nano)imprinting system. This is followed by drying or sintering to form a metal wire with a desired shape. While these inks offer a solution to some of the difficulties with prior art methods for providing conductive paths on substrates such as glass, they are generally not suitable for textiles that may melt or deform at the high sintering temperatures employed in curing the inks.

Moreover, these inks frequently suffer from poor long-term storage stability and/or undergo aggregation or precipitation of the particles, causing nozzle clogging when using certain printing methods. Polymeric materials have been used as stabilizers to circumvent such problems. However, excessive use of the stabilizers increases the viscosity of the inks or causes other problems, such as increased surface tension, higher sintering temperatures, and decreased conductivity.

One approach to solve some of these problems with the nanoparticle inks is to use organometallic salts or complexes as metal precursors. However, silver-containing carboxylic acid salts are generally not readily soluble and have high decomposition temperatures, which limit their applicability. Attempts to solve such problems have been made, for example, by the use of silver precursors in which an electron donor, such as an amine or phosphine compound, is coordinated to a fluorinated carboxylic acid. Such metal complex inks have low metal solids content and/or also suffer from poor storage stability, which limit their application in products where highly reliable and conductive metal traces are needed.

Accordingly, there is a need in the art for improved inks and methods for printing those inks on textiles to produce e-textiles.

SUMMARY

Described herein are methods for forming e-textiles, wherein the methods generally comprise printing a particle-free conductive ink on a textile substrate, and curing the textile substrate to produce a conductive pattern thereon. According to certain aspects of the invention, curing the textile substrate may be accomplished by exposing the textile substrate to heat and/or light. For example, the textile substrate may be cured by exposure to heat, such as at temperatures of less than 250° C., or less than 200° C., or less than 150° C. Alternatively, or in addition, curing may include irradiating the textile substrate, such as by exposure to 2 to 20 pulses of light, e.g., photonic curing, or may include exposure to infrared radiation. Once cured, the conductive pattern on the textile substrate may have a sheet resistance as low as 1Ω/□ or even lower.

According to certain aspects of the invention, the textile substrate may be heated to a temperature of 30° C. to 90° C. before and/or during the printing process, such as 30° C. to 60° C., or 40° C. to 90° C. before and/or during the printing process.

Printing on the substrate may be via flexographic printing, gravure printing, gravure offset printing, rotary screen process printing, pneumatic aerosol jet printing, ultrasonic aerosol jet printing, extrusion printing, slot die printing, microdispersion, direct write printing, inkjet printing or a combination. According to certain aspects of the present invention, the conductive ink may be printed via inkjet printing and the method may produce a printed pattern that exhibits an ink bleed of less than 0.5 mm, such as less than 0.2 mm, or even less than 0.1 mm.

According to certain aspects of the invention, the pattern may include one or more layers of the particle-free conductive ink, such as at least 2 layers, or at least 4 layers, or at least 6 layers or more of the particle-free conductive ink.

The substrate may include polymers, organic and synthetic fibers, plastics, metals, ceramics, glasses, silicon, semiconductors, and other solids can be used. Organic and inorganic substrates can be used. According to certain aspects of the invention, the substrate may be a textile such as a knit, woven, or nonwoven textile or fabric formed of organic or synthetic fibers. Exemplary fibers of such textile substrates include at least polyester, polyamides, nylon, Evolon®, elastane, and other synthetic materials, in addition to organic materials (e.g., cotton, cellulose, silk, wood, wool fibers).

The conductive pattern printed on the textile substrate may comprise a sensor, an electrode, a trace, an antenna, a heating element, or any combination thereof.

The particle-free conductive ink may comprise at least one metal complex dissolved in a solvent, wherein the at least one metal complex comprises at least one metal, at least one first ligand, and at least one second ligand. Exemplary metals include silver, gold, or copper. Exemplary first ligands include amines and sulfur containing compounds, and exemplary second ligands include carboxylic acids, dicarboxylic acids, and tricarboxylic acids. Exemplary solvents include one or more polar protic solvents, such as at least two polar protic solvents selected from the group comprising at least water, alcohols, amines, amino alcohols, polyols, and combinations thereof.

The metal complexes may have a solubility at 25° C. in the solvent of at least 50 mg/ml, or at least 250 mg/ml, or at least 500 mg/ml, or at least 1,000 mg/ml, or at least 1,500 mg/ml, or at least 2,000 mg/ml.

The present invention is also directed to methods of forming a conductive pattern. According to certain aspects of the invention, the method comprises depositing the particle-free conductive inks detailed herein on a substrate, and curing the substrate to produce a conductive pattern having a conductivity of at least 1,000 S/m, such as at least 5,000 S/m, or at least 10,000 S/m, or at least 50,000 S/m, or at least 100,000 S/m, or at least 1,000,000 Sm, or at least 10,000,000 S/m, or even $2 \times 10^7$ S/m.

According to certain aspects of the invention, the first and second ligands volatilize upon heat at a temperature of 250° C. or less, 200° C. or less, or even 150° C. or less, so that the curing may be at a temperature of 250° C. or less, 200° C. or less, or even 150° C. or less.

According to certain aspects of the invention, curing the substrate may additionally or alternatively comprises irradiating the substrate for a time period of not more than 15 minutes. Irradiating the substrate may include exposure to pulsed light, such as from 2 to 20 pulses of light, and/or infrared radiation.

Also disclosed are e-textiles formed by the methods of the present invention, and wearable electronic devices comprising the e-textiles.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

FIGS. 1A-1C illustrate prior art methods for incorporating conductive materials to a textile, such as by incorporating conductive threads;

FIG. 2 illustrates a prior art method for incorporating conductive traces between insulating or protective layers;

FIGS. 4A and 4B show two different magnifications of scanning electron micrograph (SEM) images of a single layer of nanoparticle silver ink printed on Evolon®; FIG. 4C is a cross sectional view SEM image of the same textile, wherein the fibers are colored green and the nanoparticle silver ink is shown in red; FIG. 4D shows the distribution of the nanoparticle silver ink throughout the textile shown in FIG. 4C (i.e., only the nanoparticle silver ink is shown); and FIG. 4E shows resistance readings for 2 to 5 layers of nanoparticle inks printed on Evolon® or modified Evolon®;

DETAILED DESCRIPTION

Figure 3:
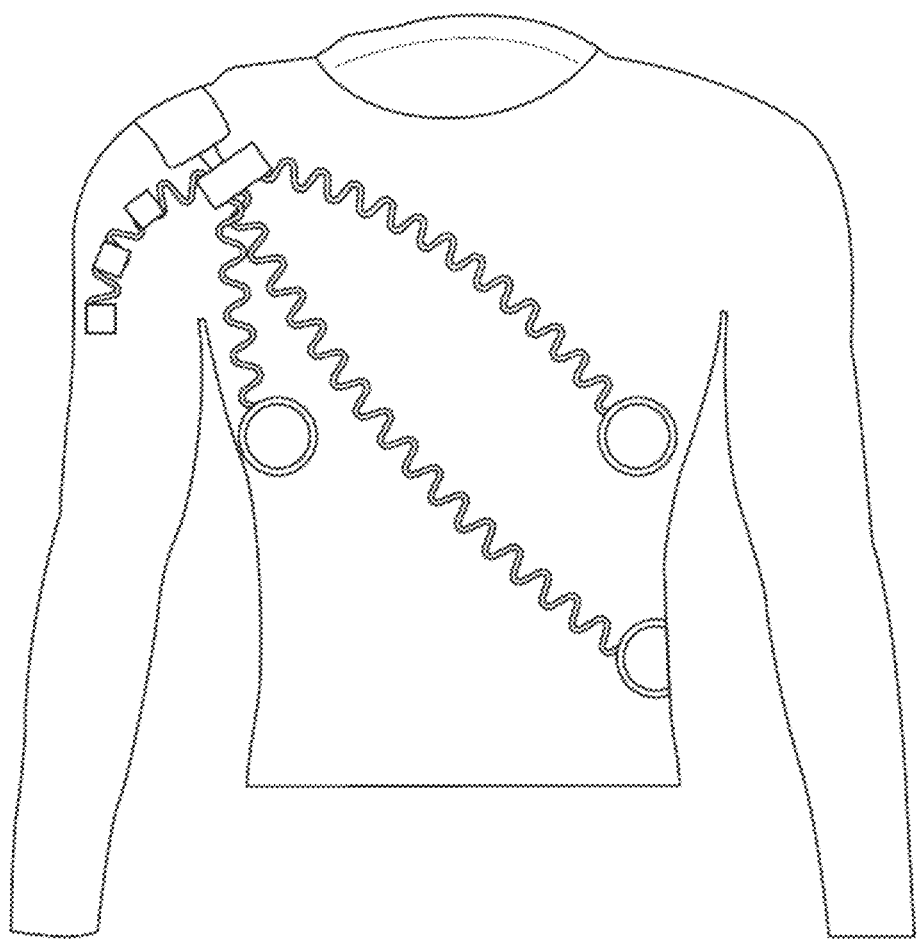
FIG. 3 illustrates a wearable electronic device which incorporates the conductive traces of the prior art shown in FIG. 2.

In the following description, the present invention is set forth in the context of various alternative embodiments and implementations involving particle-free conductive inks, methods for printing these inks on textiles, and e-textiles having these inks printed thereon. While the following description discloses numerous exemplary embodiments, the scope of the present patent application is not limited to the disclosed embodiments, but also encompasses combinations of the disclosed embodiments, as well as modifications to the disclosed embodiments.

Various aspects of the particle-free conductive inks and e-textiles disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the inks, e-textiles, and methods disclosed herein may be described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the e-textiles disclosed herein in addition to the orientation depicted in the drawings. By way of example, if aspects of the e-textiles in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made to "a" textile, "an" upper layer, "a" metal, "an" ink, and "the" metal complex, one or more of any of these components and/or any other components described herein can be used.

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

"Substantially free", as used herein, is understood to mean inclusive of only trace amounts of a constituent. "Trace amounts" are those quantitative levels of a constituent that are barely detectable and provide no benefit to the functional properties of the subject composition, process, or articles formed therefrom. For example, a trace amount may constitute 1.0 wt. %, 0.5 wt. %, 0.1 wt. %, 0.05 wt. %, or even 0.01 wt. % of a component of any of the particle-free ink formulations disclosed herein. "Totally free", as used herein, is understood to mean completely free of a constituent.

Unless defined otherwise, all technical and scientific terms used herein have the same meanings as commonly understood by one of ordinary skill in the art.

The present invention provides methods for printing particle-free conductive inks on textiles to form e-textiles. These e-textiles may find use in a range of different applications, including at least wearable sensors for fitness and health monitoring, gas sensors and filters for use in industrial applications, antimicrobial dressings for use in medical applications, flexible energy storage devices, heating elements, and communication devices.

Certain prior art e-textiles have included conductive elements as part of the yarn used to form the textile, such as shown in FIGS. 1A-1C. For example, conductive metal threads have been woven with standard organic, polymeric, or synthetic threads to form conductive yarns, which can then be used to produce a textile. FIG. 1A shows a metal wrapped yarn, FIG. 1B shows a metal filled yarn, and FIG. 1C shows a metal yarn (i.e., yarn formed wholly of metal threads or wire). These textiles tend to be rough and/or porous, and can be costly due to the expense of the conductive materials (generally metals). These costs can be reduced by using the yarns to produce specific conductive patterns in the textile, but this generally requires changes to manufacturing processes that are not easily altered.

Alternatively, conductive patterns have been incorporated on flexible substrates (FIG. 2), which are then adhered to the textile to form wearable electronics (FIG. 3). These patterns may not be stretchable and/or washable, and application of the patterns may require additional manual and/or manufacturing processes.

Figure 4A:
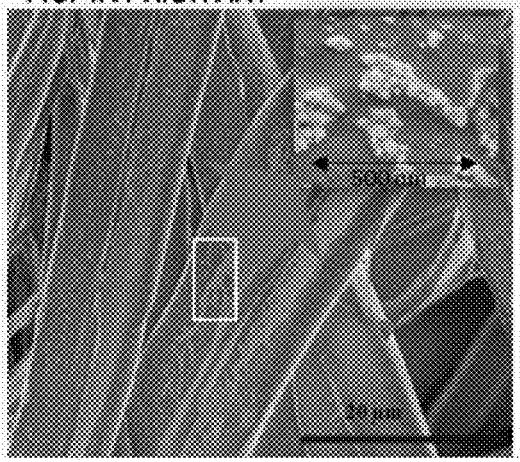
FIGS. 4A-4E illustrate aspects of the prior art nanoparticle inks printed on a non-woven textile, where
Figure 4B:
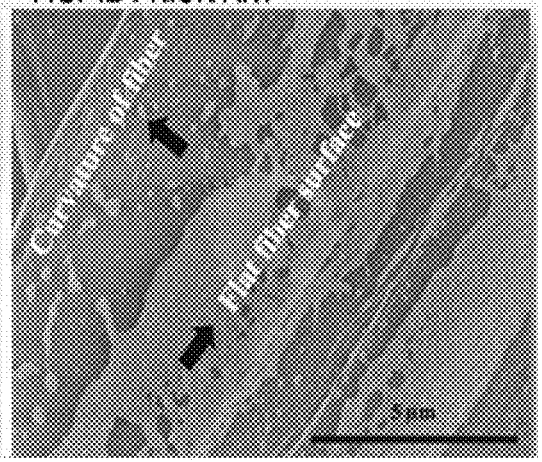
Figure 4C:
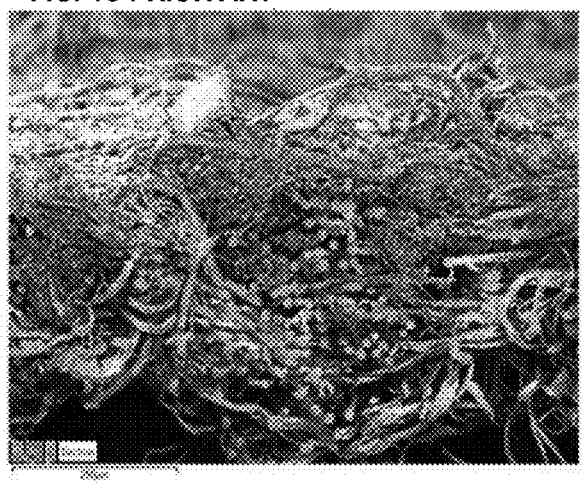
Figure 4D:
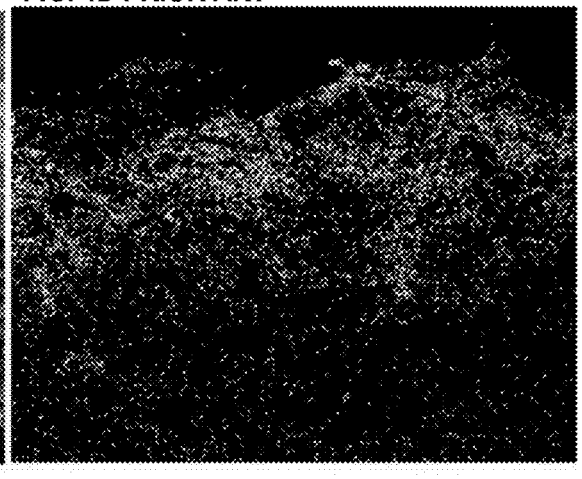

Direct print methods have been used to form conductive patterns. Such methods would be easily scalable, easily integrated into current textile manufacturing processes, and provide a high throughput, highly automated means to provide conductive elements, and thus electronic elements into textiles. The conductive inks of the prior art, however, often do not show good results. For example, inkjet printing with nanoparticle inks has proven challenging due to clogging of the nozzle and either too little interaction with the textile surface, e.g., pooling, or too much interaction with the textile surface, e.g., spreading due to capillary effects. As shown in FIGS. 4A and 4B, for example, nanoparticle inks printed on nonwoven textiles such as Evolon® can pool, failing to coat the fibers to the extent required to form a conductive pattern. Even after multiple layers are applied, such as the 6 layers of ink shown in FIGS. 4C and 4D, scanning electron micrograph images show that the ink is pooled into islands separated by non-coated areas. For example, FIGS. 4C and 4D show that the Evolon® nonwoven fiber (green) includes the ink (red dots) discontinuously on the top (FIG. 4C) and throughout the thickness of the textile via capillary spreading (FIG. 4D).

Figure 4E:
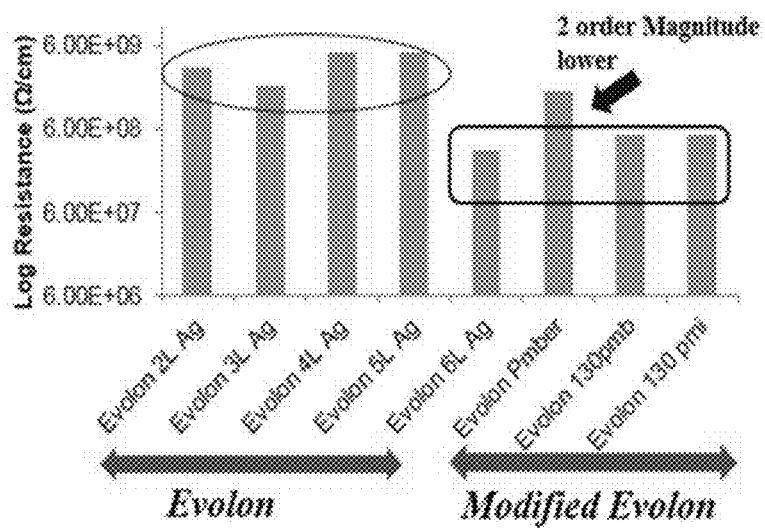
Figure 4F:
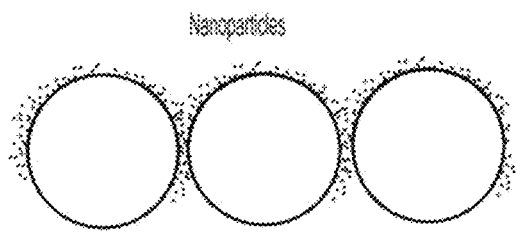
FIGS. 4F and 4G are schematic diagrams showing the coating of textile fibers by a nanoparticle ink of the prior art and conformal coating of textile fibers by the particle-free inks of the presently disclosed invention, respectively.

As shown in FIG. 4E, because these nanoparticle inks fail to form a continuous pattern, they demonstrate extremely high resistance (i.e., fail to form conductive traces). Moreover, additional coating layers of the nanoparticle inks does not reduce the resistance of these printed patterns. Modification of the textile to decrease surface resistance is possible, such as up to 2 orders of magnitude, but still does not form conductive patterns (FIG. 4E at right). The red dots on the green background in FIGS. 4C and 4D represent clustered silver particles with little silver-to-silver fusion or connectivity; hence the poor conductivity of silver nanoparticle films (see FIG. 4F). The poor conductivity is further worsened by the low temperature limitation of most textile substrates, such as fabrics, which makes it impossible to systematically fuse silver particles with the high temperatures often required for nanoparticle ink curing.

Figure 5:
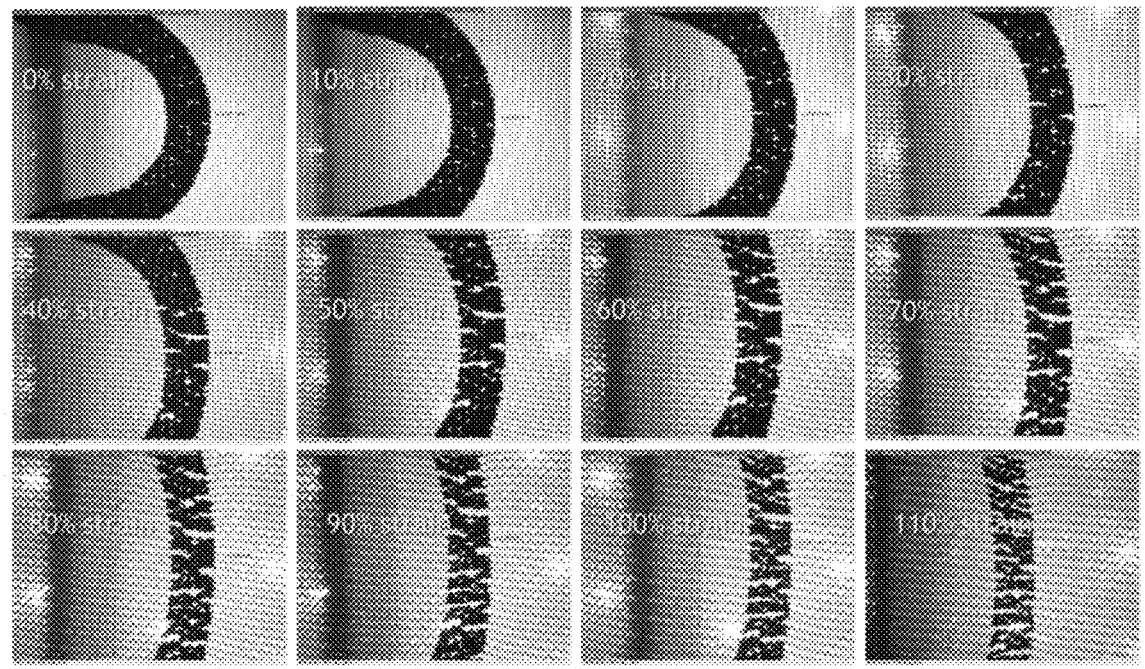
FIG. 5 illustrates knit textiles screen-printed with conductive materials of the prior art under different amounts of strain (i.e., stretch of the textile)

Patterns formed on textiles with nanoparticle inks generally show poor flexibility during use of the textile (e.g., multiple wear and/or wash cycles). As illustrated in FIG. 5, strain such as by stretching a screen printed woven textile leads to breaks in the conductive pattern, rendering the pattern non-conductive over time. In fact, as little as 10% strain on the textile can lead to an observable increase in breaks in the printed pattern and loss of conductivity.

Figure 4G:
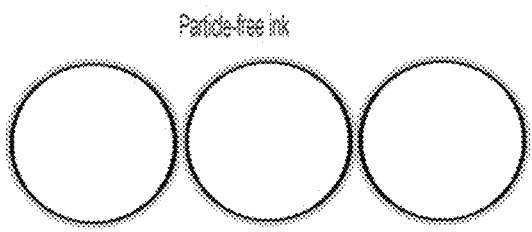

The inventive processes disclosed herein circumvent many of these difficulties by directly printing a pattern on the textile using particle-free conductive inks, and thus provide highly scalable and automated methods for producing e-textiles. The methods generally comprise using a direct printing process, such as inkjet printing, to deposit a particle-free conductive ink on the textile substrate, which is then cured to produce a conductive pattern thereon. As such, the conductive patterns may be formed on the textile, or on the final wearable product, in a manner that is easily integrated into current manufacturing processes, and more importantly, is easily scalable and can be highly automated. Moreover, the methods disclosed herein provide conformal coating of the particle-free ink on the textile fibers (FIG. 4G) that allows for greatly improved conductivity and longevity of the conductive trace. As used herein, the term "conformal" shall be taken to mean a coating that covers at least the surface of a textile, fiber, or substrate, and which follows the contours of the surface.

Particle-Free Conductive Inks

The particle-free conductive inks of the present invention generally include a metal complex dissolved in a solvent. The metal complex can be mononuclear, dinuclear, trinuclear, and higher. For example, the metal complex may be a neutral metal complex comprising at least one metal, at least one first ligand, and at least one second ligand. The metal complex may be as described in US Patent Application Publications 2011/0111138 and 2013/0236656. The metal complex may comprise a first metal complex having at least one first metal, and a second metal complex having at least one second metal. The metal complex may be as described in U.S. Pat. No. 9,920,212.

For example, according to certain aspects of the present invention, a neutral metal complex may be formed by first forming a complex between the metal (M) and the second ligand ($L_2$), such as by reacting a metal, metal salt, or metal oxide with the second ligand. The metal-second ligand complex may then be reacted with an excess of the first ligand ($L_1$) to form the neutral metal complex. The stoichiometric reaction ratio between the first ligand and the metal-second ligand complex can be, for example, at least 2:1, such as at least 5:1, or at least 10:1, or at least 13:1, or at least 15:1, or at least 20:1. When formulated in this way, the reaction mixture remains substantially or totally free of particles, and progresses to completion forming a metal complex having stoichiometric amounts of the first and second ligands and the metal.

The excess, unreacted first ligand may be removed to provide the metal complex having stoichiometric amounts of the metal, first ligand, and second ligand (i.e., free of unliganded first ligand). According to certain aspects of the invention, the excess, unreacted first ligand may be removed by vacuum evaporation of the complex, and may include one or more wash steps with an appropriate solvent, to yield a final dry powder having stoichiometric amounts of the metal, first ligand, and second ligand. For silver metal complexes, this powder is typically white.

The resulting purified metal complexes are substantially or totally free of particles (particle-free) including nanoparticles and microparticles, and are highly soluble in various solvents. This differs greatly from prior art complexes which do not include stoichiometric amounts of the metal, first ligand, and second ligand; and/or may include residual unliganded first ligand; and generally include particles such as nanoparticles and/or microparticles. Printing of these prior art nanoparticle inks on certain textiles has demonstrated that they often do not penetrate into the textile, but rather pool on top of the textile, as observed in the scanning electron microscopy images shown in FIGS. 4A-4D, and the schematic in FIG. 4F, and thus do not form conductive traces (see FIG. 4E). The conductive inks of the present invention are capable of conformally coating fibers of a textile substrate (see FIG. 4G).

According to certain aspects of the present invention, the conductive inks may be formulated by dissolving at least one purified metal complex, which is free of any unreacted first ligand, in an organic solvent system such as a hydrocarbon solvent system.

According to certain aspects of the present invention, the conductive inks may be formulated by dissolving at least one purified metal complex, which is free of any unreacted first ligand, in at least one polar protic solvent, such as at least two polar protic solvents. In general, polar protic solvents can have high polarity and high dielectric constants. Polar protic solvents may comprise, for example, at least one hydrogen atom bound to an oxygen or a nitrogen. Polar protic solvents may comprise, for example, at least one acidic hydrogen. Polar protic solvents may comprise, for example, at least one unshared electron pair. Polar protic solvents may display, for example, hydrogen bonding.

The viscosity of hydrogen bonding solvents is inherently greater than non-hydrogen bonding solvents such as hydrocarbons. Further the elevated solvent boiling points (due to energetically greater intermolecular forces) and polar ink nature render them capable and competent systems for the formation of thin films and structures of greater quality than strictly hydrocarbon or aromatic hydrocarbon delivery systems due to slower controlled drying times, surface tensions, and surface wetting properties.

Polar protic solvents may be particularly useful for depositing the conductive inks on certain substrates, since hydrocarbon solvent(s) may not be compatible with the substrate and/or may not be recommended in some situations. Moreover, polar protic solvents may provide a more environmentally friendly ink solution.

Examples of polar protic solvents include water, linear or branched alcohols, amines, amino alcohols, and hydroxyl-terminated polyols including glycols. The polar protic solvent may also be, for example, ethylene and higher glycols, as well as alcohols. Particular examples of polar protic solvents include water, methanol, ethanol, n-propanol, iso-propanol, n-butanol, acetic acid, formic acid, and ammonia.

The polar protic solvent may include, for example, at least one amine solvent. The amine solvent may have a molecular weight of, for example, about 200 g/mol or less, or about 100 g/mol or less. The amine solvent may be, for example, at least one monodentate amine, at least one bidentate amine, and/or at least one polydentate amine. The amine solvent may be, for example, at least one primary amine or at least one secondary amine. In one embodiment, the amine solvent may comprise at least one alkyl group bonded to at least one primary or secondary amine. In one particular embodiment, the amine solvent may comprise at least two primary or secondary amine groups connected by a linear or branched alkyl group. In another particular embodiment, the amine solvent may comprise at least two linear or branched alkyl groups connected by at least one secondary amine. Advantages of the amine solvent include, for example, improved solubility and thus higher possible concentrations of the metal complex in the solvent, as well as lower decomposition temperatures for the metal complex.

The conductive inks of the present invention may be formulated to include hydrogels and/or polymers, such as polyacrylic acids, having lower molecular weights, and which may function as viscosity modifiers. For example, the compositions may include up to 5 wt. % of a hydrogel and/or polymer, such as up to 4 wt. %, or up to 3 wt. %, or up to 2 wt. %, or up to 1 wt. %, or up to 0.5 wt. %, or up to 0.1 wt. %, or up to 0.05 wt. %. The compositions may include hydrogels and/or polymers at from 0.01 wt. % to 5 wt. %, such as 0.01 wt. % to 4 wt. %, or 0.01 wt. % to 3 wt. %, or 0.01 wt. % to 2 wt. %, or 0.01 wt. % to 1 wt. %. According to certain aspects, the polymer may be a conductive polymer, such as any of the polyacetylenes, polyanilines, polyphenylenes, polypyrenes, polypyrroles, polythiophenes, etc. known in the art.

The metal complexes described herein may have a solubility in at least one polar protic solvent at 25° C. of at least 50 mg/ml, or at least 100 mg/ml, or at least 150 mg/ml, or at least 200 mg/ml, or at least 250 mg/ml, or at least 300 mg/ml, or at least 400 mg/ml, or at least 500 mg/ml, or at least 1,000 mg/ml, or at least 1,500 mg/ml, or even or at least 2,000 mg/ml.

According to certain aspects, the amount of organic solvent in the conductive inks disclosed herein can be, for example, less than 30 wt. %, less than 20 wt. %, less than 10 wt. %, less than 5 wt. %, less than 3 wt. %, less than 1 wt. %, less than 0.1 wt. % or less than 0.01 wt. %. According to certain aspects, the conductive ink formulations may be substantially or totally free of organic solvent.

Analysis of the conductive ink formulations, in either of the organic or polar protic solvent systems, has shown that the amounts of the metal, and first and second ligands, in the ink solutions are stoichiometric (see Examples).

According to certain aspects of the present invention, the viscosity of the ink formulations measured at 25° C. can be, for example, about 800 cps or less, about 500 cps or less, about 250 cps or less, or about 100 cps or less. According to certain other aspects, the viscosity of the ink formulations measured at 25° C. can be, for example, about 50 cps or less, 40 cps or less, 30 cps or less, 25 cps or less, 20 cps or less, or even 10 cps or less. According to yet other aspects, the ink formulations have a viscosity of about 1 cps to about 20 cps, or about 1 cps to about 15 cps, or about 1 cps to about 10 cps.

According to certain aspects of the present invention, the viscosity of the ink formulations measured at 25° C. can be, for example, about 800 cps or more, such as about 1500 cps or more, about 2,500 cps or more, about 5,000 cps or more, or even about 10,000 cps or more.

The conductive ink formulations may be substantially or totally free of particles, microparticles, and nanoparticles. In particular, the conductive ink formulations comprising the metal complex may be substantially or totally free of nanoparticles including metal nanoparticles, or free of colloidal material. For example, the level of nanoparticles can be less than 1 wt. %, less than 0.1 wt. %, or less than 0.01 wt. %, or less than 0.001 wt. %. One can examine the composition for particles using methods known in the art including, for example, SEM and TEM, spectroscopy including UV-Vis, dynamic light scattering, plasmon resonance, and the like. Nanoparticles can have diameters of, for example, 1 nm to 500 nm, or 1 nm to 100 nm. Microparticles can have diameters of, for example, 0.5 μm to 500 μm, or 1 μm to 100 μm.

Metal Complex

The metal complex may comprise a metal useful for forming electrically conducting lines, particularly those metals used in the semiconductor and electronics industries. Exemplary metals include at least silver, gold, copper, platinum, ruthenium, nickel, cobalt, palladium, zinc, iron, tin, indium, and alloys thereof. The metal complexes may comprise a single metal center or two metal centers.

For example, the metal complex may be a neutral metal complex comprising at least one metal, at least one first ligand, and at least one second ligand. The first ligand may be adapted to volatilize when heated without formation of a solid product. For example, the first ligand may volatize upon heating at a temperature of, for example, 250° C. or less, or 200° C. or less, or 150° C. or less. Heating can be done in the presence or absence of oxygen. The first ligand may be a reductant for the metal. The first ligand may be in neutral state, such as neither an anion nor a cation.

The first ligand may be a monodentate ligand, or a polydentate ligand including, for example, a bidentate or a tridentate ligand. According to certain aspects of the invention, the first ligand may be a thioether, such as tetrahydro-thiophene, a phosphine, or an amine compound. In certain examples, the first ligand may comprise an amine compound having at least two primary amine groups. Primary amines are stronger reducing agent than alcohols and are capable of forming homogenous solutions with polar protic solvents. Moreover, the first ligand may comprise two primary amine end groups and no secondary amine group, or one primary amine end group and one secondary amine end group. In this latter example, the secondary amine end group may be substituted with a linear alkane or a polar group, such as a hydroxy or alkoxy. In yet another example, the first ligand may comprise two primary amine end groups and one secondary amine group. The first ligand may be an amine including an alkyl amine. The alkyl groups can be linear, branched, or cyclic. Bridging alkylene can be used to link multiple nitrogen together. In the amine, the number of carbon atoms can be, for example, 15 or less, or 10 or less, or 5 or less.

The molecular weight of the first ligand, may be, for example, about 1,000 g/mol or less, or about 500 g/mol or less, or about 250 g/mol or less.

In particular examples, the first ligand is ethylenediamine, 1,3-diaminopropane, diaminocyclohexane, or diethyl ethylenediamine.

The second ligand is different from the first ligand and may also volatilize upon heating the metal complex. For example, the second ligand may release carbon dioxide, as well as volatile small organic molecules. The second ligand may be adapted to volatilize when heated without formation of a solid product. The second ligand may volatize upon heating at a temperature of, for example, 250° C. or less, or 200° C. or less, or 150° C. or less. Heating can be done in the presence or absence of oxygen. The second ligand can be anionic. The second ligand may be self-reducing.

According to certain aspects of the invention, the second ligand may be a carboxylate. The carboxylate may comprise a linear, branched or cyclic alkyl group. In one embodiment, the second ligand does not comprise an aromatic group. The second ligand may be an amide represented by —N(H)—C(O)—R, wherein R is a linear, branched or cyclic alkyl group, with 10 or fewer carbon atoms, or 5 or fewer carbon atoms. The second ligand can also be an N-containing bidentate chelator.

The molecular weight of the second ligand, including the carboxylate, may be, for example, about 1,000 g/mol or less, or about 500 g/mol or less, or about 250 g/mol, or about 150 g/mol or less or less.

In particular examples, the second ligand may be isobutyrate, oxalate, malonate, fumerate, maleate, formate, glycolate, lactate, citrate, or tartrate.

Thus, according to certain aspects of the present invention, the metal complex may comprise at least one metal, at least one first ligand, and at least one second ligand, wherein the metal may be silver, gold, or copper. Exemplary first ligands include amines and sulfur containing compounds, and exemplary second ligands include carboxylic acids, dicarboxylic acids, and tricarboxylic acids. Exemplary solvents include one or more polar protic solvents, such as at least two polar protic solvents selected from the group comprising at least water, alcohols, amines, amino alcohols, polyols, and combinations thereof.

According to certain other aspects, the metal complex may comprise at least one first metal complex having at least one first metal, at least one second metal complex having at least one second metal, at least one third metal complex having at least one third metal, and so forth, wherein each metal complex may comprise stoichiometric amounts of a metal and first and second ligands. For example, the metal complex may comprise two neutral metal complexes formed as detailed above (i.e., having stoichiometric amounts of at metal and first and second ligands).

According to certain other aspects of the present invention, the metal complex may be configured to provide a metal alloy (e.g., after curing in the textile substrate). The metal complex may comprise at least one first metal complex, wherein the first metal complex comprises a first metal and at least one first ligand and at least one second ligand, different from the first ligand; and at least one second metal complex, which is different from the first metal complex, and comprises a second metal and at least one first ligand and at least one second ligand, different from the first ligand, for the second metal; and at least one solvent. The (i) the selection of the amount of the first metal complex and the amount of the second metal complex, (ii) the selection of the first ligands and the selection of the second ligands for the first and second metals, and (iii) the selection of the solvent may be adapted to provide a homogeneous composition.

According to yet other aspects, the metal complex may comprise at least one first metal complex having at least one first metal in an oxidation state of (I) or (II), and at least two ligands, wherein at least one first ligand is an amine and at least one second ligand is a carboxylate anion; at least one second metal complex, which is different from the first metal complex, wherein the second metal complex is a neutral complex comprising at least one second metal in an oxidation state of (I) or (II), and at least two ligands, wherein at least one first ligand is a sulfur compound and at least one second ligand is the carboxylate anion of the first metal complex.

According to certain other aspects of the present invention, the metal complex may comprise at least one first metal complex, wherein the first metal complex is a neutral, dissymmetrical complex comprising at least one first metal in an oxidation state of (I) or (II), and at least two ligands, wherein at least one first ligand is an amine and at least one second ligand is a carboxylate anion; at least one second metal complex, which is different from the first metal complex, wherein the second metal complex is a neutral, dissymmetrical complex comprising at least one second metal in an oxidation state of (I) or (II), and at least two ligands, wherein at least one first ligand is sulfur compound and at least one second ligand is the carboxylate anion of the first metal complex; at least one organic solvent, and wherein the atomic percent of the first metal is about 20% to about 80% and the atomic percent of the second metal is about 20% to about 80% relative to the total metal content.

Exemplary metals for use in these metal alloys include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, and Hg. In particular, coinage metals can be used including silver, gold, and copper. Precious metals can be used including gold, iridium, osmium, palladium, platinum, rhodium, ruthenium, and silver. In other preferred embodiments, platinum, nickel, cobalt, and palladium can be used. Still further, lead, iron, tin, ruthenium, rhodium, iridium, zinc, and aluminum can be used. Other metals and elements can be used as known in the art.

According to certain aspects, the first metal complex is a silver, gold, copper, platinum, nickel, iridium, or rhodium complex. For example, the first metal complex may be a silver complex. According to certain aspects, the second metal complex is a silver, gold, copper, platinum, nickel, iridium, or rhodium complex. For example, the second metal complex may be a gold complex. Examples of binary combinations of metals to form binary alloys include at least Ag—Au, Pt—Rh, Au—Cu, Zn—Cu, Pt—Cu, Ni-Al, Cu—Al, Pt—Ni, and Pt—Ir.

The metal complexes of the metal alloy can comprise a plurality of ligands including two or more ligands, or just two ligands. There can be, for example, a first ligand and a second ligand, different from each other. The first ligand can provide sigma electron donation, or dative bonding. The first ligand can be in a neutral state, not an anion or cation. Examples of the first ligand include amines, oxygen-containing ligands, and sulfur-containing ligands including oxygenated ethers and thioethers, including cyclic thioethers. Asymmetrical or symmetrical amines can be used. The amines can comprise, for example, at least two primary or secondary amine groups. Monodentate ligands can be used. Polydentate or multidentate ligands can be used. Alkylamino ligands can be used.

The second ligand can be different from the first ligand and can volatilize upon heating the metal complex. For example, it can release carbon dioxide, as well as volatile small organic molecules such as propene, in some embodiments. The second ligand can be a chelator with minimum number of atoms that can bear an anionic charge and provide a neutral complex. The second ligand can be anionic. For example, the second ligand can be a carboxylate, including a carboxylate comprising a small alkyl group. The number of carbon atoms in the alkyl group can be, for example, ten or less, or eight or less, or five or less. The molecular weight of the second ligand can be, for example, about 1,000 g/mol or less, or about 250 g/mol or less, or about 150 g/mole or less.

The metal complexes of the presently disclosed invention can be substantially or totally free of particles, including nanoparticles and microparticles, when in the dried state (powder) or when formulated as an ink in at least one solvent. The ink can be substantially or totally free of particles, including nanoparticles and microparticles, before deposition or printing. The ink can be substantially or totally free of particles, including nanoparticles and microparticles, after deposition but before reduction to metal (e.g., before curing). The ink can be substantially or totally free of particles, including nanoparticles and microparticles, after deposition and reduction to metal.

Direct Printing

Methods known in the art can be used to deposit inks including, for example, pipetting, inkjet printing, lithography or offset printing, gravure or gravure offset printing, flexographic printing, microdispersion direct write printing, screen printing or rotary screen process printing, offset printing, stencil printing, drop casting, slot die, roll-to-roll, stamping, roll coating, spray coating, flow coating, extrusion printing, and aerosol delivery such as spraying or pneumatic or ultrasonic aerosol jet printing. One can adapt the ink formulation and the substrate with the deposition method.

In certain examples, the inks are deposited by direct printing methods such as pipetting, stencil printing, rolling, spraying, or inkjet printing. In certain example, the particle-free conductive inks are deposited using inkjet printing.

According to certain aspects, the conductive inks of the present invention are printed directly onto a surface of the textile.

According to certain aspects, certain textile substrates may benefit from pre-treating the textile, such as prewashing the textile and optionally treating by oxygen plasma, corona, and/or chemical etch (e.g., acidic, caustic). Accordingly, the conductive inks of the present invention may be printed on the textile substrate after it has been pretreated by oxygen plasma, corona, and/or chemical etch.

According to certain other aspects of the present invention, certain textile substrates may benefit from addition of a coating. For example, cellulose based substrates such as paper and/or cotton textiles may need a coating to reduce ink bleed and enhance conductivity of traces formed thereon. That is, the cellulose or cotton based substrates may be coated with a transparent layer, such as a polyurethane coating prior to printing the conductive pattern.

One can adapt the viscosity of the ink to the deposition method. For example, viscosity can be adapted for inkjet printing. Viscosity of the ink formulations measured at 25° C. can be, for example, about 500 cps or less, such as 200 cps or less, or 50 cps or less, or even 25 cps or less. Viscosity of the ink formulations measured at 25° C. can be, for example, at least 50 cps. Viscosity of the ink formulations measured at 25° C. can be, for example, about 50 cps or less, such as about 25 cps or less. According to certain other aspects, the viscosity of the ink formulations measured at 25° C. can be, for example, about 1 cps to about 20 cps, or about 1 cps to about 10 cps. Viscosity of the ink formulations may be tuned through selective ratios of polar protic solvents (e.g., ratio of water to amine).

Alternatively, the ink viscosity can be formulated, for example, to be greater than 15 cps, or 20 cps, or even 25 cps, such as by addition of binders, resins, or other additives or solids that may thicken or increase the viscosity of the ink formulation. For example, one can adapt the concentration of dissolved solids in the ink to about 2,000 mg/ml, or 1,500 mg/ml or less, about 1,000 mg/ml or less, about 500 mg/mL or less, about 250 mg/mL or less, about 100 mg/mL or less, about 50 mg/mL or less, or about 10 mg/mL or less.

Additives may also be included to adapt the wetting properties of the ink. Additives such as, for example, surfactants, dispersants, colorant (e.g., dye), and/or binders can be used to control one or more ink properties as desired. For example, a hydrophilic binder may aid in wetting certain textiles, and thus may aid in providing a conductive trace that conformally coats the textile fibers (i.e., improve conductivity of the conductive trace). For example, the conductive ink formulations may include up to 10 wt. % of one or more additives, such as up to 8 wt. %, or up to 6 wt. %, or up to 4 wt. %, or up to 2 wt. %, or up to 1 wt. %, or up to 0.1 wt. %, or up to 0.05 wt. %. The compositions may include additives at from 0.01 wt. % to 5 wt. %, such as 0.01 wt. % to 4 wt. %, or 0.01 wt. % to 3 wt. %, or 0.01 wt. % to 2 wt. %, or 0.01 wt. % to 1 wt. %.

According to certain aspects, the ink formulations of the present invention are substantially or totally free of additives such as surfactants, dispersants, colorant (e.g., dye), and/or binders.

Nozzles can be used to deposit the precursor, and the nozzle diameter can be, for example, less than 200 micrometers, or even less than 100 micrometers. The absence of particulates can help with prevention of nozzle clogging. The nozzle may deposit the ink in droplets, wherein a drop size may be less than 200 micrometers, such as less than 100 micrometers, or less than 50 micrometers, or even less than 30 micrometers. The nozzle may deposit the ink in droplets, wherein a drop volume is less than 100 picoliter (pL), or less than 50 pL, or less than 25 pL, or even less than 15 pL. The drops may be deposited at a density greater than 30 drops per inch, such as greater than 60 drops per inch, or greater than 90 drops per inch, or greater than 200 drops per inch, or greater than 500 drops per inch, or greater than 1,000 drops per inch, or greater than 1,500 drops per inch, or greater than 2,500 drops per inch, or greater than 4,000 drops per inch, or greater than 6,000 drops per inch.

According to certain aspects of the present invention, the particle-free conductive inks of the present invention may be printed on textile substrates at ambient conditions, such as at standard room temperatures and pressures.

Figure 6:
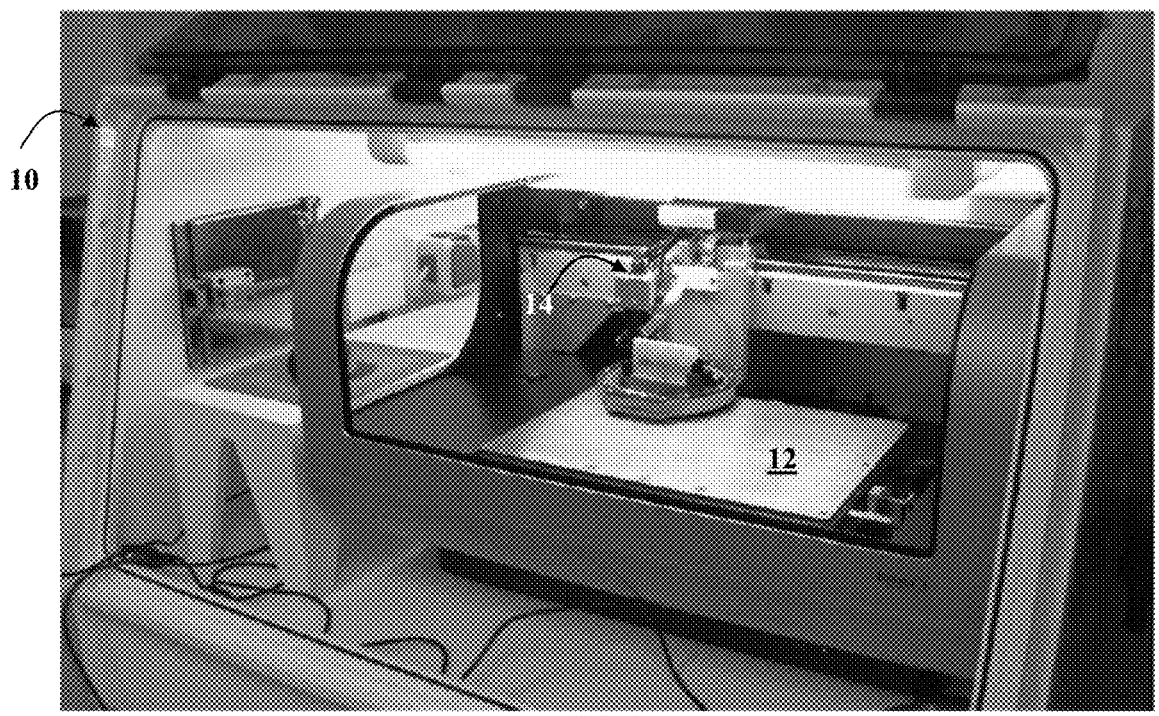
FIG. 6 illustrates an inkjet printer setup useful in methods of the presently disclosed invention.

According to certain aspects of the present invention, the textile substrate may be heated before and/or during deposition of the ink. For example, the textile substrate may be heated to temperatures of 40° C. to 90° C. With reference to FIG. 6, an exemplary inkjet printer 10 is shown which includes a heated platen 12 and a nozzle assembly 14. In use, the particle-free conductive inks of the present invention may be loaded to the printer 10 so that droplets of the ink may be deposited. The platen 12 may be heated to temperatures of 30° C. to 90° C., such as 30° C. to 60° C., or 40° C. to 90° C. during printing.

While specific numbers are listed herein for the size and density of the droplets, volume of the droplets, and the nozzle size, these values may vary depending on the printing method chosen, the printer chosen (e.g., nozzle configuration), the viscosity of the conductive ink, and the coverage desired.

Thus, according to certain methods of the present invention, the conductive inks of the present invention may be deposited on a substrate such as a textile that is heated during deposition, followed by a curing step that converts the metal complex in the ink formulation to a metallic structure ("in situ curing"). Thus, as used herein, in situ curing may be taken to mean heating the textile during deposition of the conductive ink followed by any of the curing steps detailed herein that convert the metal complex in the ink formulation to a metallic structure.

According to certain other methods of the present invention, the conductive inks of the present invention may be deposited on a substrate such as a textile at ambient temperatures (and pressures), followed by a curing step that converts the metal complex in the ink formulation to a metallic structure ("ex situ curing"). Thus, as used herein, ex situ curing may be taken to mean that the textile is not heated during deposition of the conductive ink, and before any of the curing steps detailed herein that convert the metal complex in the ink formulation to a metallic structure.

Figure 7A:
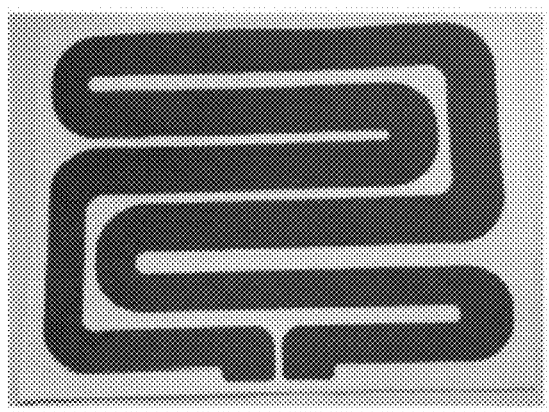
FIGS. 7A and 7B show photographs of the front and back, respectively, of a nonwoven textile having a conductive pattern printed thereon in accordance with certain aspects of the presently disclosed invention.
Figure 7B:
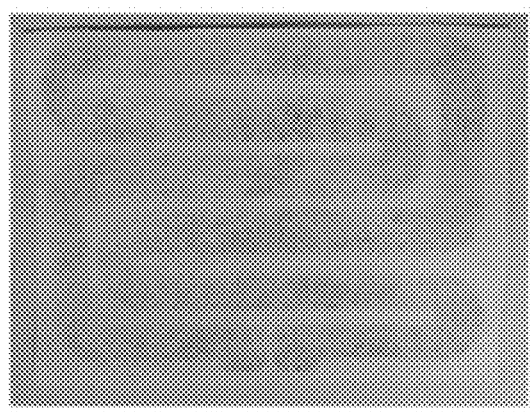

Shown in FIGS. 7A and 7B are the front and back, respectively, of an exemplary e-textile produced using methods and inks according to the present invention. For example, an exemplary silver ink formulation may include a silver complex having stoichiometric amounts of first and second ligands, dissolved in two or more polar protic solvents, such as water and any of an alcohol and/or amine. Generally, such an ink solution is formulated to include the silver complex at 250 mg/ml or greater, such as 500 mg/ml. These solutions are clear. Heating the textile during deposition of the conductive ink may reduce the ink bleed outside of the printed region. For example, the conductive traces formed using the inks and methods of the present invention may exhibit an ink bleed of less than 0.5 mm, such as less than 0.4 mm, or less than 0.3 mm, or less than 0.2 mm, or even less than 0.1 mm. As used herein, the term "ink bleed" may be taken to mean a measure of the precision of the ink deposition, and is referred to in terms of the distance from a defined edge (intended border) of a printed trace that the ink may extend.

An exemplary solution of 500 mg/ml of an ink composition according to aspects of the present invention may have a viscosity of about 5-15 cps at 25° C., a density of about 1.0-1.3 g/mL, a pH of at least 10-13, a surface tension of about 15-34 dyne/cm, and a silver content of about 15-25 wt. %. Ink jet printing of such an ink may include depositing the ink as droplets of between 5-200 micrometers at 60-6,000 drops per inch to a textile substrate heated at between 30° C. to 90° C. on the platen 12, such as 65 micrometers at 1270 drops per inch. The textile may then be cured at a temperature of less than 200° C. for a time of less than 30 minutes, such as for between 2-20 minutes at 140° C., or 10 minutes at 140° C. Alternatively, the textile may be cured by exposure to infrared radiation for a time of less than 30 minutes, such as for between 2-20 minutes, or 10 minutes. An exemplary line wide resulting from this method may about 2 mm, and may show an ink bleed of less than 0.5 mm, such as less than 0.2 mm, or even less than 0.1 mm. Moreover, the pattern demonstrated a resistivity of less than 10Ω/□, such as less than 5Ω/□, or less than 1Ω/□, or from 0.1Ω/□ to 0.9Ω/□.

According to certain aspects, the conductive traces of the presently disclosed invention may have sheet resistance values of less than 10.0Ω/□, or less than 8.0Ω/□, or less than 6.0Ω/□, or less than 4.0Ω/□, or less than 2.0Ω/□, or less than 1.0Ω/□, such as from 0.1Ω/□ to 1.0Ω/□. Certain applications of the conductive traces may benefit from increased sheet resistance, such as more than 2.0Ω/□ or 10.0Ω/□, such as resistive heaters.

Exemplary systems that may be used in methods of the presently disclosed invention include FujiFilm Dimatix DMP 2850 and DMP 2931. Using this printer, the particle-free conductive inks of the present invention may be printed to textiles pre-heated on the platen using a drop size of 5-200 micrometers, or a drop volume of less than 100 pL, at 60-6,000 drops per inch. The textile may then be cured on the platen in the device, such as for 10 minutes at 140° C. or 10 minutes exposure to infrared radiation, or removed to an oven or other area for curing, wherein the metal in the metal complex turns to a solid conductive metal. Curing may be by any method disclosed herein.

Key factors affecting the conductivity achievable by the presently disclosed inks and printing methods include compatibility of the ink chemistry with the surface energy of the textile, the textile size and structure (woven, non-woven), pretreatment of the textile, such as with $O_2$ plasma, and the curing methods, such as the in situ heating of the textile during printing which provides high resolution traces, and the low temperature curing (<200° C.; see section below regarding curing). Thus, the presently disclosed inks and methods provide a large advantage over the prior art inks shown in FIGS. 4A-4E, wherein the particles of the ink may clog the nozzles of an inkjet device, and traces formed using the inks are generally non-conductive (i.e., show very high sheet resistance) and non-compatible with many textiles as they require high cure temperatures.

An exemplary textile printed as detailed above is shown in FIGS. 7A-7B and 8A-8C. Shown in FIGS. 7A-7B, are front (top) and back (bottom) sides of a nonwoven textile substrate printed with the particle-free conductive inks of the present invention and cured to form the conductive pattern (i.e., converted to a metallic structure) using in situ curing.

Figure 8A:
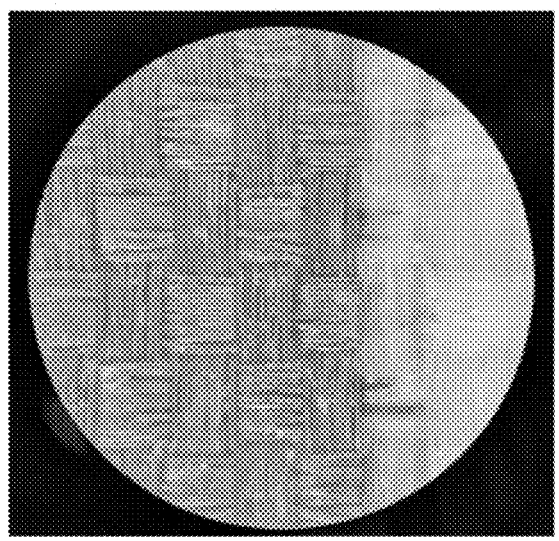
FIG. 8A shows a woven textile having a conductive ink according to certain aspects of the presently disclosed invention conformally coated on a portion thereof (coated at left; uncoated at right)
Figure 8B:
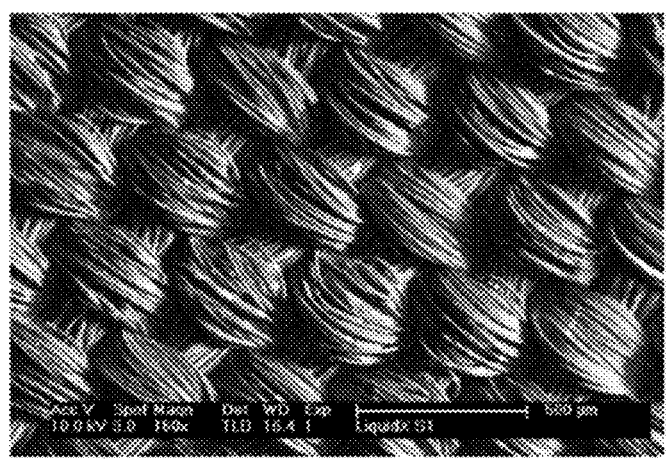
FIGS. 8B and 8C show close-up SEM views of the coated portions of the textile (150× and 800× magnification, respectively)
Figure 8C:
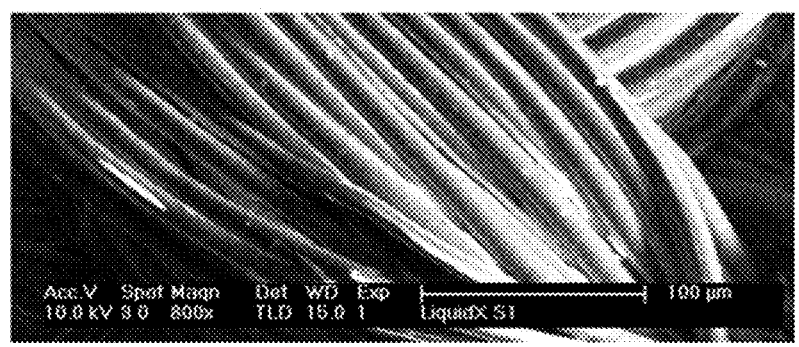

Shown in FIG. 8A is a close-up view of a woven textile substrate having printed section (left) and a non-printed section (right), wherein printing was on a heated substrate (in situ heat cure) using the particle-free conductive inks of the present invention. FIGS. 8B and 8C show scanning electron microscopy images (SEM) of the printed textile taken by SEM (150× and 800× magnification). These images demonstrate that the in situ curing demonstrates better "dying" of the fibers of the substrate. That is, the particle-free inks according to the present invention may better penetrate (e.g., soak into the fibers of the textile), or may more completely coat an outer surface (e.g., encapsulate or soak into an outer surface of the textile; conformal coating) of a heated textile substrate, acting as a dye on the textile substrate and improving the conductivity of patterns formed in the heated substrates. Prior art conductive inks, which comprise particles (nanoparticles, flakes, etc.), would not be able to penetrate the textile and were found to sit on top of the textile substrate as shown in FIGS. 4A and 4B. This leaves the prior art inks more susceptible to removal by abrasion and other forces exerted on the textile substrate through standard wear and tear. Thus, the in situ heat curing promotes better coating around the fabric thread (i.e., conformal coating; see FIG. 4G).

The present inventors have found that the sheet resistance values for textiles (knit, woven, and nonwoven such as Evolon®) printed with the particle-free conductive inks according to the present invention using in situ curing is improved over ex situ curing for most textile substrates. The in situ curing lowers the sheet resistance, in some cases several orders of magnitude over values measured from ex situ cured conductive traces, and also reduces the ink bleed. These results were consistent for all numbers of printed layers tested (number of layers in the conductive trace). Thus, methods of the presently disclosed invention, which include heating of the textile during deposition of the ink, such as by inkjet printing, not only leads to improved trace resolution, but also improved conductivity of the trace.

Additionally, the sheet resistance values for knit and non-woven (Evolon®) textiles printed with the particle-free conductive inks according to the present invention were improved by pretreatment by oxygen plasma or corona. Accordingly, methods of the presently disclosed invention, which include heating of the textile before and/or during deposition of the ink, such as by ink jet printing, may also include pretreatment of the textile, and may provide improved conductivity of the trace over untreated textiles.

Textile Substrates

A wide variety of solid materials can be subjected to deposition (e.g., printing) of the particle-free conductive inks of the present invention. Polymers, organic and synthetic fibers, plastics, metals, ceramics, glasses, silicon, semiconductors, and other solids can be used. Organic and inorganic substrates can be used.

In particular examples, the substrate is a textile such as a knit, woven, or nonwoven fabric formed of organic or synthetic fibers. Exemplary fibers of such textile substrates include at least polyester, polyamides, spandex, polyester-spandex, nylon, nylon-spandex, Evolon®, elastane, and other synthetic materials, in addition to organic materials (e.g., cotton, cellulose, silk, wood, wool fibers, leather, suede). Blends of any of these materials are also possible.

According to certain aspects of the invention, the textiles may be pretreated with a reactive gas, such as an $O_2$ plasma or corona, that may improve deposition of the particle-free conductive inks thereon, and may reduce sheet resistance.

Additionally, the textiles may be prewashed and dried prior to deposition or printing of the conductive inks disclosed herein.

Curing the Particle-Free Conductive Inks

Once the particle-free conductive ink formulations have been printed onto a substrate, such as a textile substrate, at either ambient temperatures or elevated temperatures, they may be cured to form the conductive pattern (i.e., converted to a metallic structure). Curing can include heating the printed substrate, and/or irradiating the printed substrate. In certain examples, the printed substrate may be cured by heating to a temperature of 200° C. or less, such as 150° C. or less, or 100° C. or less, for a time period of less than 60 minutes, such as less than 30 minutes, or less than 15 minutes. In a particular example, the printed substrate is heated to 140° C. for 10 minutes, or exposed to infrared radiation for 10 minutes, to form a conductive pattern with a resistance of less than 1Ω/□.

Figure 10:
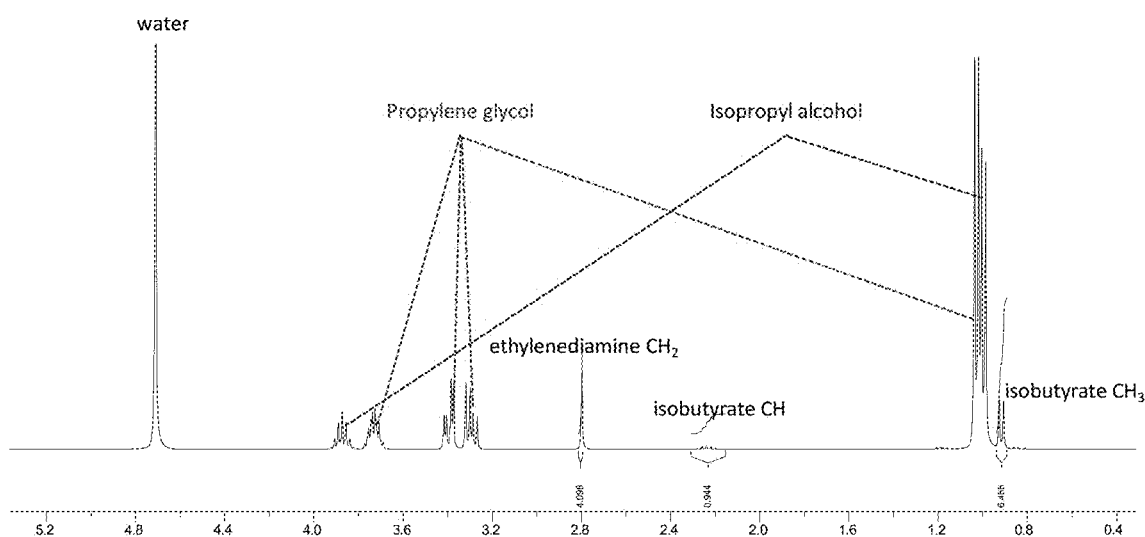
FIG. 10 shows a proton nuclear magnetic resonance ($^1$H-NMR) scan of an exemplary particle-free conductive ink (ethylenediaminosilver(I) isobutyrate dissolved in polar protic solvents and in $D_2O$) according to certain aspects of the presently disclosed invention.

Exemplary sheet resistance values are shown for knit, woven, and nonwoven textiles cured ex situ or in situ (i.e., printed on the textile at ambient temperatures and cured; or printed on the textile at elevated temperatures and cured; FIG. 10). The lowest sheet resistance was found for conductive traces on woven polyester, with either in situ or ex situ curing, while both the knit and nonwoven textiles benefited from in situ curing. Close-up views of the coated fibers of knit, nonwoven, and woven textiles cured either ex situ or in situ are also shown in FIGS. 7A-7F.

In certain examples, the conductive trace on the textile substrate may be additionally, or alternatively, cured by exposure to pulsed light, such as by photonic curing, wherein the number of pulses ranges from 2 to 20. Alternatively, or in addition, curing may include irradiating the conductive trace on the textile substrate, such as by exposure to infrared radiation.

Protective Coatings

According to certain aspects of the present invention, the conductive traces formed using the particle-free inks disclosed herein may be coated with a protective coating, such as a dielectric coating. For example, all or a portion of a trace may be coated with a polymer coating, such as an aqueous dielectric polymer solution. Exemplary polymer solutions include at least acrylic and polyurethane polymers. The protective coating can be deposited by painting, spraying, or printing (e.g., inkjet printing). The viscosity of the polymeric solutions can be adjusted for the specific textile and deposition method by dilution with appropriate solvents and solvent mixtures. Such coatings may be cured by heat treatment, evaporation of solvents, irradiation (e.g., UV treatment), or any combination thereof. An exemplary coating includes an acrylic-based coating that is printed over the conductive trace and is cured by heating the textile to 160° C. or less, such as 150° C. or less for 30 minutes or less, such as 20 minutes or less.

Figure 11:
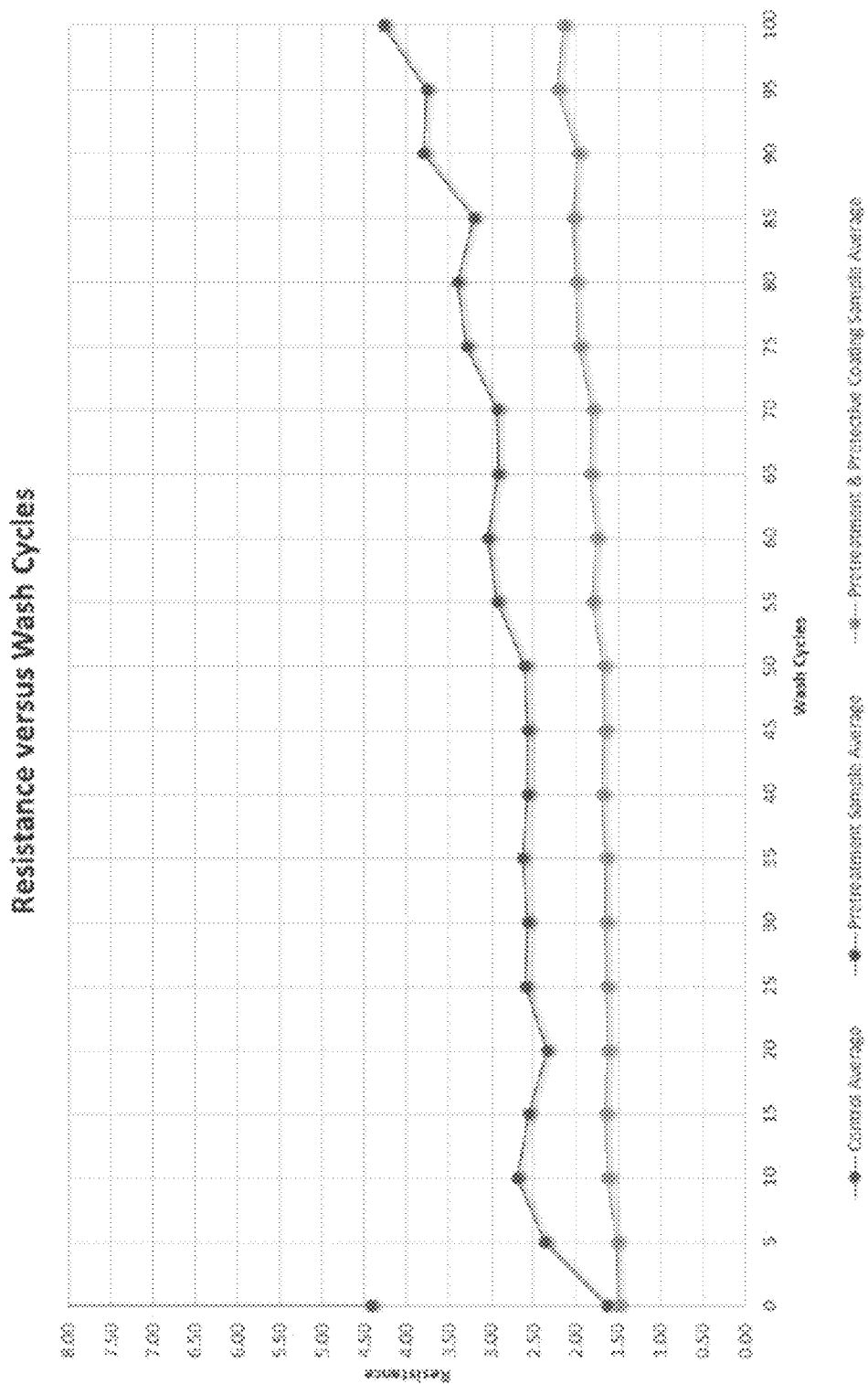
FIG. 11 shows a graph of the resistance (ohms) after multiple wash cycles for a conductive trace on a textile using inks and methods in accordance with certain aspects of the presently disclosed invention.

The coatings may improve washability of the conductive traces, as shown in FIG. 11, and may also improve abrasion resistance of the conductive traces (see Table 5 in examples).

Additional coatings may be provided over contact regions, such as at the contact points or pads of a trace. Such coatings may include conductive polymers, and may provide conductive contact with the printed trace while also protecting the trace from abrasion and/or during wash cycles.

E-Textile

Figure 14:
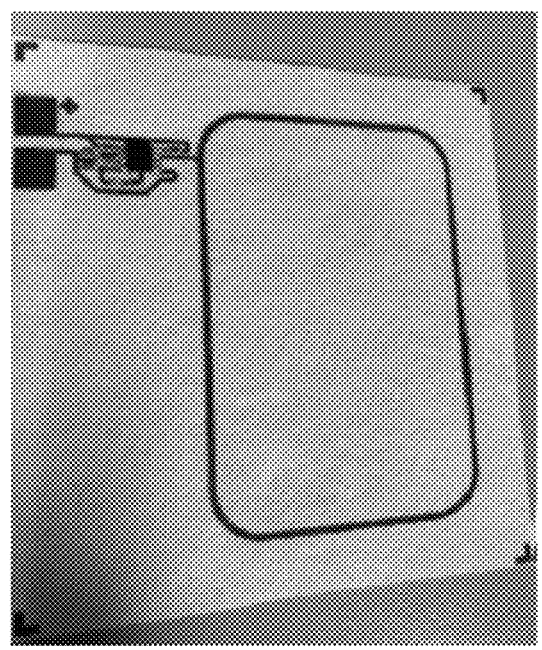
FIG. 14 shows a picture of an e-textile proximity sensor printed using inks and methods in accordance with certain aspects of the presently disclosed invention.

The present invention is also directed to e-textiles. These e-textiles include any textile having printed thereon at least one conductive trace or pattern using inks and/or methods disclosed herein. The traces may terminate in contact pads or connectors for connection to a current, such as a power supply or battery. Various hardware elements may be connected to portions of the trace or pattern to form electric devices. As such, the conductive patterns on the e-textiles may be formed as a trace or pattern that may provide a sensor (e.g., optical, thermal, humidity, gas, pressure, acceleration, strain, force, and proximity), a conductor, an electrode, a circuit, an interconnect, a light, an antenna, a resistive heating element, a switch, a transparent conductive element, a battery, or any combination thereof. An exemplary e-textile comprising a proximity sensor according to the presently disclosed invention is shown in FIG. 14.

The e-textiles may be incorporated into or may be wearable electronic devices. The e-textiles may find use in many different industries for a wide range of uses, such as in the medical industry for health monitoring or as anti-microbial dressings, and in industrial settings as smart clothing or devices for gas sensing or filtration. The e-textiles may find use in smart garments, such as for fitness monitoring, hygiene improvement, or as flexible energy storage devices (e.g., batteries, supercapacitors). The e-textiles may find use as resistive heaters, such as in a wearable garment or in an automobile (e.g., seat heater, electric vehicle heater). An exemplary 5-trace heating element according to the presently disclosed invention is shown in FIG. 7A.

Exemplary e-textiles may include, for example, a directional compass, one or more gyroscopes, one or more accelerometers, pressure gauges, strain gauges, temperature gauges, and fiber optics. The sensors employed in e-textiles may be used to monitor parameters of a user wearing the e-textile, such parameters may include heart rate, respiration rate, skin temperature, and body position and movement. Moreover, e-textiles may be used to measure a user's full-body biomechanics such as joint angles, angular velocity, angular acceleration, and range of motion.

These e-textiles are found to have greatly improved wear performance, e.g., bendability, washability, strain resistance, etc., over e-textiles formed using the inks and methods of the prior art. For example, the conductive patterns on the fabric substrate may withstand at least 50 wash cycles, such as at least 70 wash cycles, or even 100 wash cycles with air drying (see FIG. 11 and examples). For example, the resistance of the conductive traces formed using the inks and methods of the present invention may increase only slightly after multiple wash cycles, such as by less than 50% after 50 washes, or less than 30% after 50 washes, or less than 15% after 50 washes, or less than 70% after 100 washes, or less than 60% after 100 washes, or less than 40% after 100 washes, or less than 30% after 100 washes, or less than 20% after 100 washes, wherein a wash cycle is defined as in according to AATCC 61-2013 (laundering). As shown in FIG. 11, the protective coating may improve the washability of the e-textiles disclosed herein.

The e-textiles may be abrasion resistant (up to 500 cycles by standard ASTM testing methods), and may be sweat resistant (moisture resistant).

The e-textiles may be strain resistant. For example, knit e-textiles may be stretched by up to 50%, or up to 100%, without connection loss, generally showing a small increase in conductivity with an increase in stretching of the textile substrate (see FIG. 12 and examples).

Figure 13:
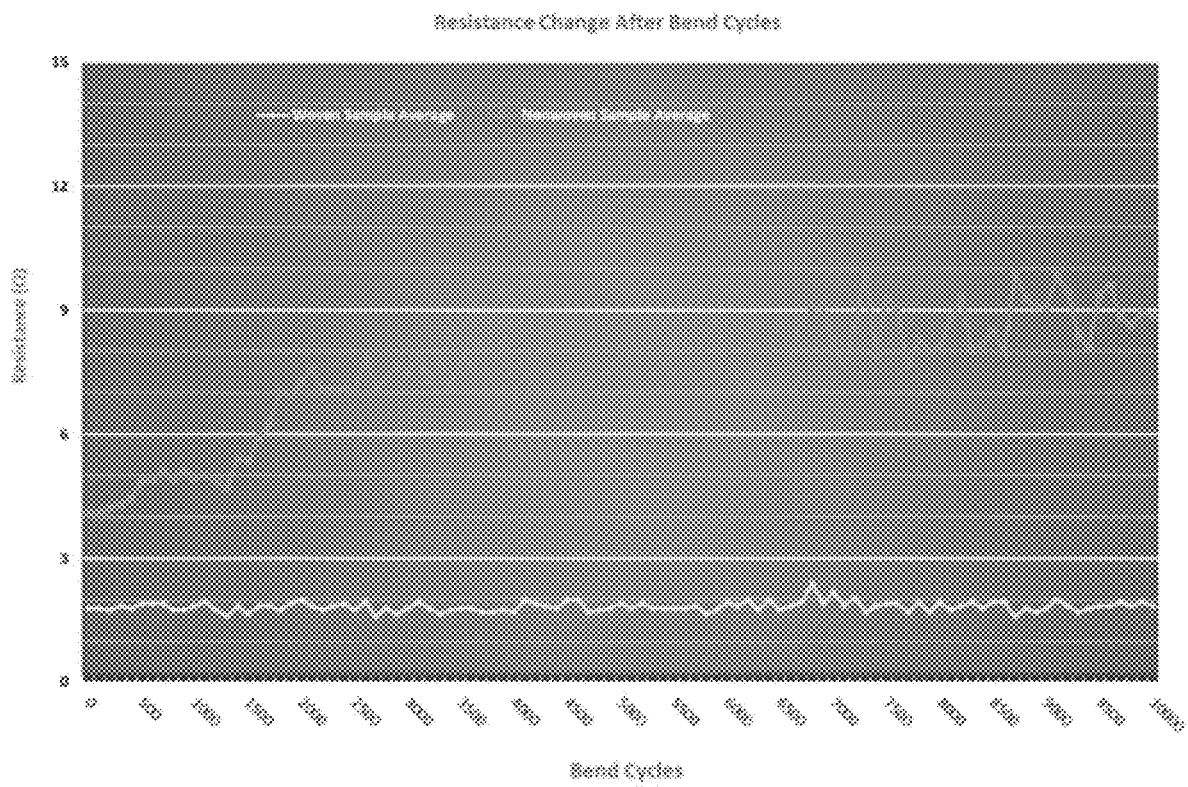
FIG. 13 shows a graph of the change in resistance with increased bending cycles for a conductive trace on a textile using inks and methods in accordance with certain aspects of the presently disclosed invention.

The e-textiles may be bendable, showing less than a 10% loss in conductivity after up to 10,000 bend cycles using standard ASTM testing methods (see FIG. 13).

E-Textile Resistive Heaters

Figure 15:
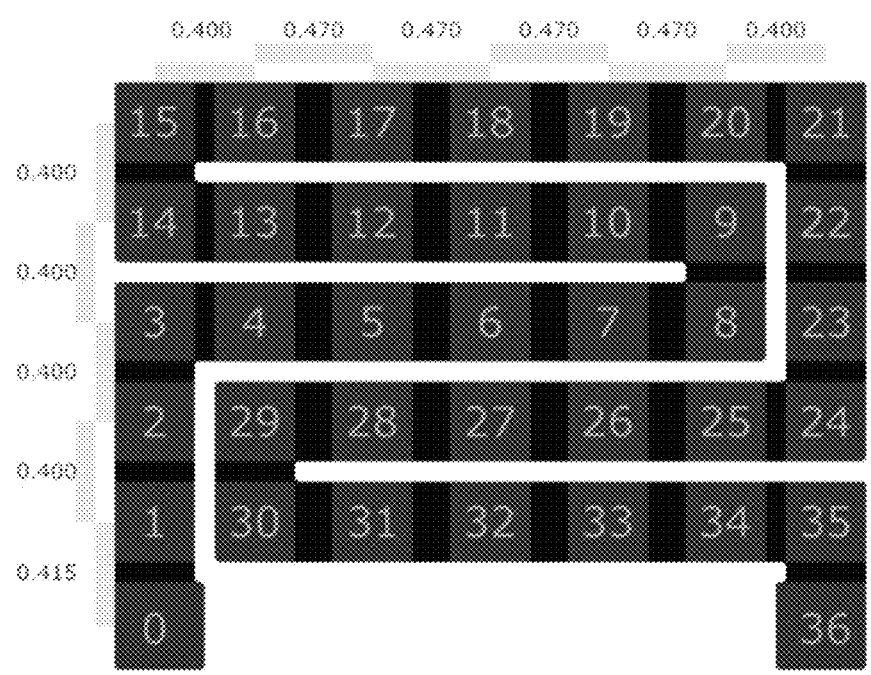
FIG. 15 shows a schematic diagram of an exemplary 5-trace heater element in accordance with certain aspects of the presently disclosed invention, wherein the numbered blocks are test locations for resistance measurements.
Figure 17A:
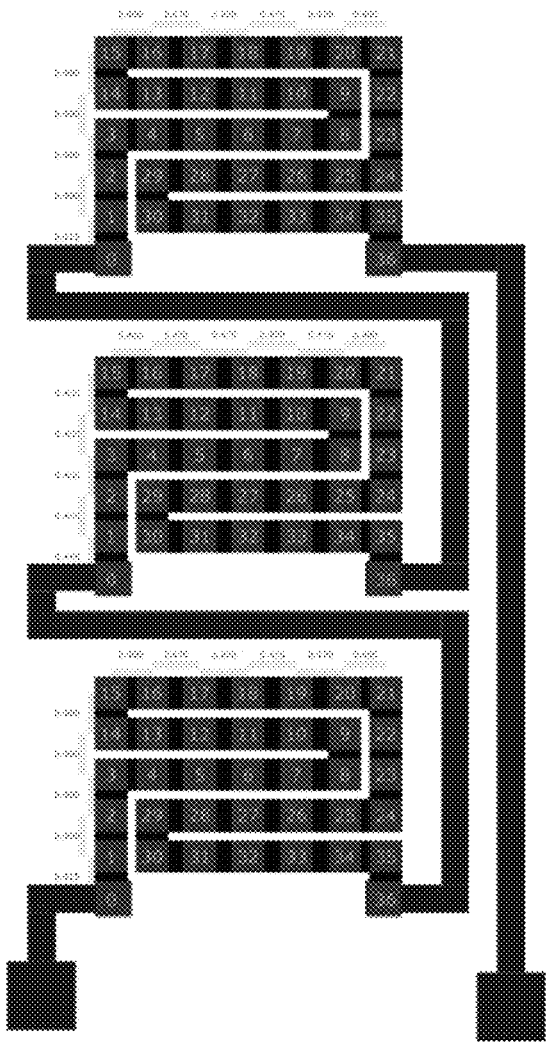
FIGS. 17A and 17B show series and parallel circuits, respectively, of 5-trace heaters formed according to certain aspects of the presently disclosed invention.
Figure 17B:
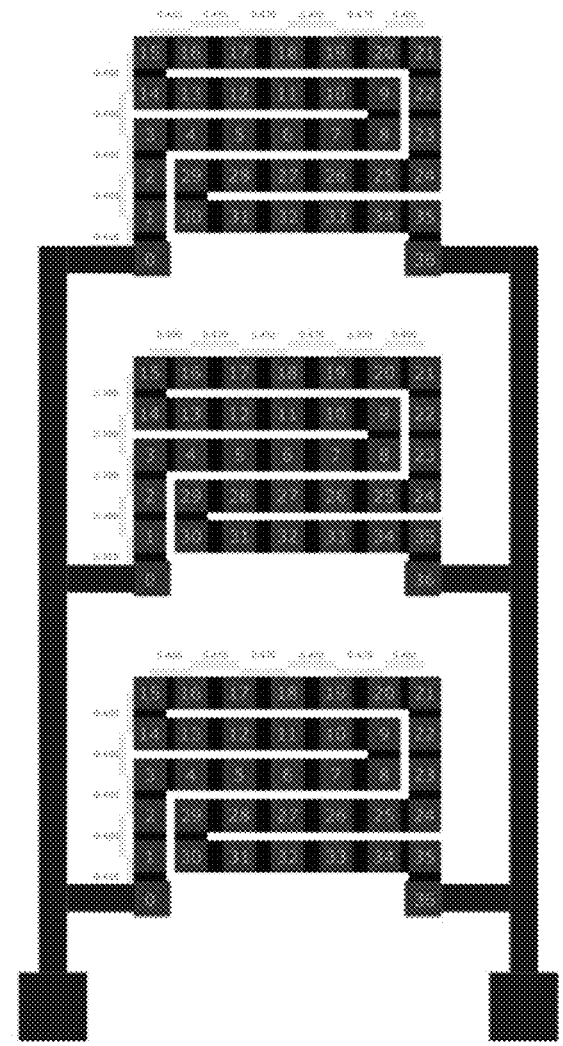

According to certain aspects of the present invention, the conductive inks may be used to print resistive heating elements on a textile. Such elements may find application as wearable heaters or heating elements for use in clothing, or resistive heating elements in the automotive industry (e.g., seat heaters, electric car heaters) and others. An exemplary 5-trace heater is shown in FIG. 15. These heaters may be placed in series, or parallel, as shown in FIGS. 17A and 17B, respectively.

Figure 16A:
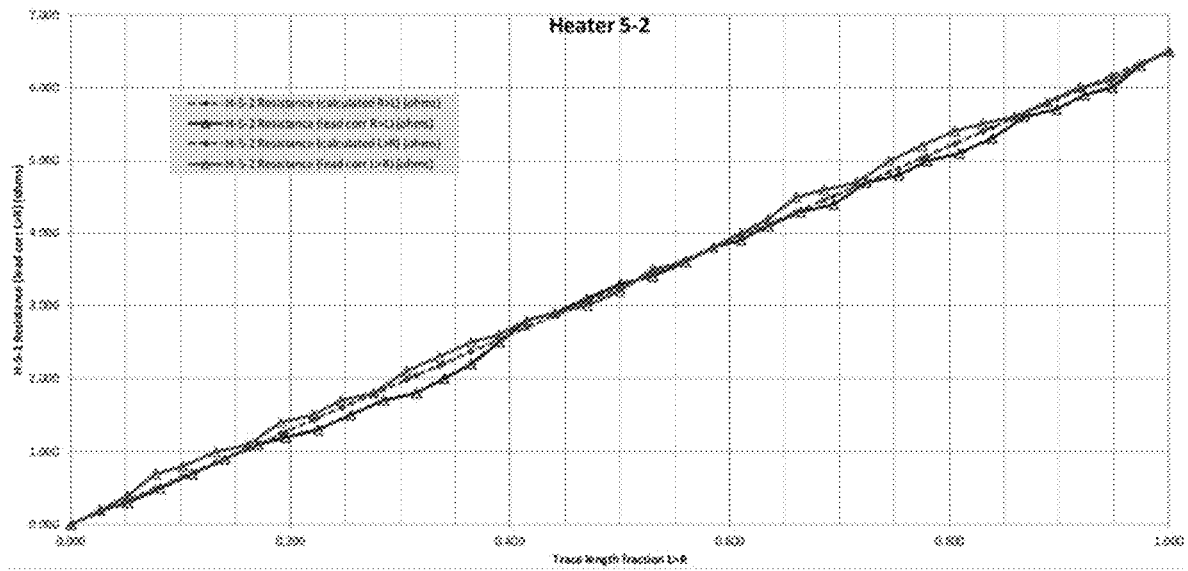
FIG. 16A shows a graph of resistance measurements from 5-trace heaters formed according to certain aspects of the presently disclosed invention, wherein the readings were taken at the locations indicated in FIG. 15, data is normalized to 1.0 for location 36.
Figure 16B:
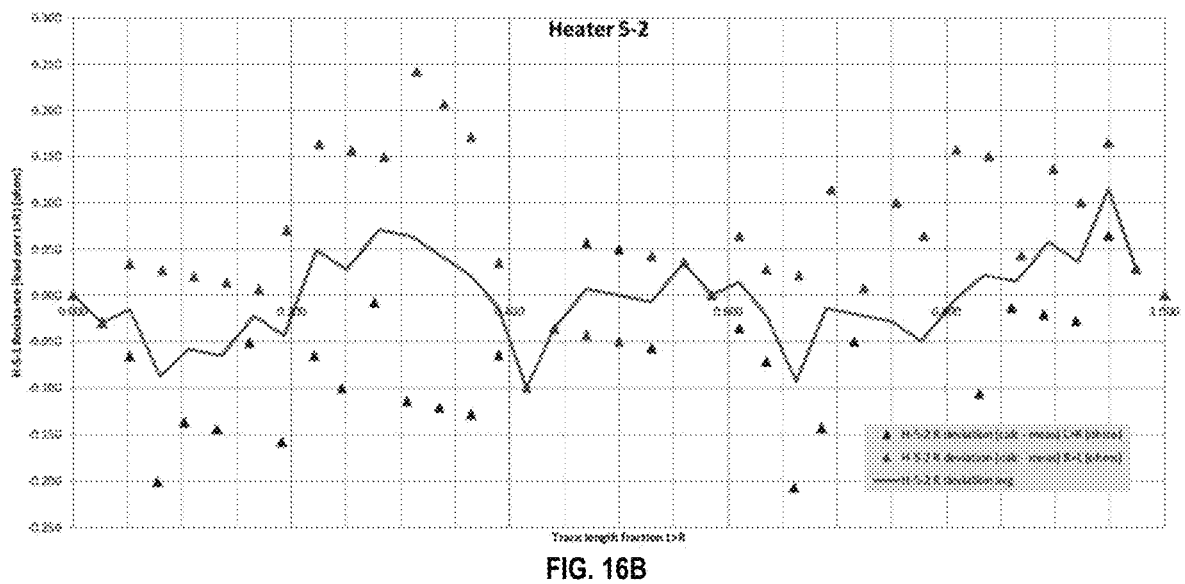
FIG. 16B shows the deviation of the data shown in FIG. 16A from the expected value (dotted lines in FIG. 16A)

Resistance measurements were taken at various points along the traces, as shown by the numbered blocks in FIG. 15, and found to vary linearly with respect to trace length (see FIG. 16A for values measure from two 5-trace heaters). In fact, the calculated and measured resistance values at each point were found to be very close (i.e., resistance measured with an alligator clip ground connection and manual tip probe; see FIG. 16B). Similar results were observed for 7-trace heaters. Left-to-right and right-to-left resistance measurements were conducted to investigate print/process-related resistance variations. When normalized for trace length, the measured resistance from 5-trace and 7-trace heaters showed remarkable correlation with the predicted resistance.

An advantage of these resistive heaters is that they are flexible, thin, and heat/cool rapidly. For example, a 5-trace heater printed using the conductive inks and methods of the present invention can heat at a rate of about 0.7° C./second to about 1° C./second. Heating is initiated almost immediately after current is provided to the resistive heater. The upper temperature limit may be limited based on the total voltage supplied to the printed trace, wherein an upper set point was found to have little effect on the heating rate (i.e., heating to 65° C. and 85° C. occurs at the same rate).

Figure 18A:
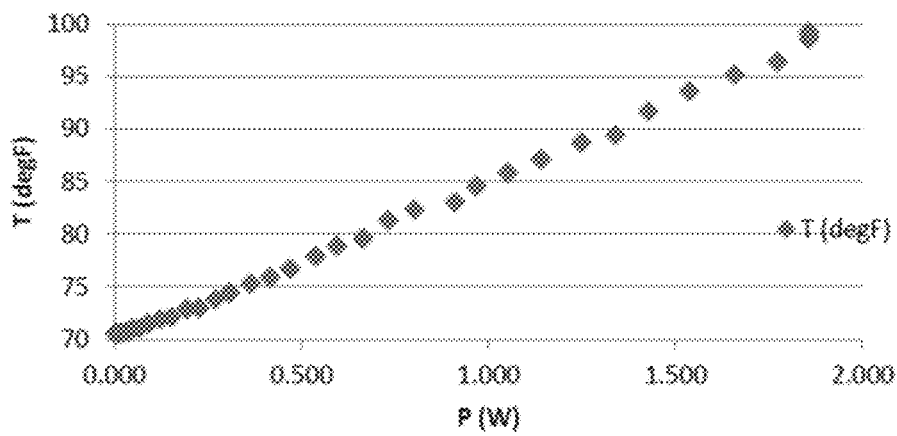
FIGS. 18A-18C show graphs demonstrating the linearity of temperature increase with power increase (FIG. 18A), and the lack of resistance drift over time or temperature (FIGS. 18B and 18C, respectively) for 5-trace heaters formed according to certain aspects of the presently disclosed invention.
Figure 18B:
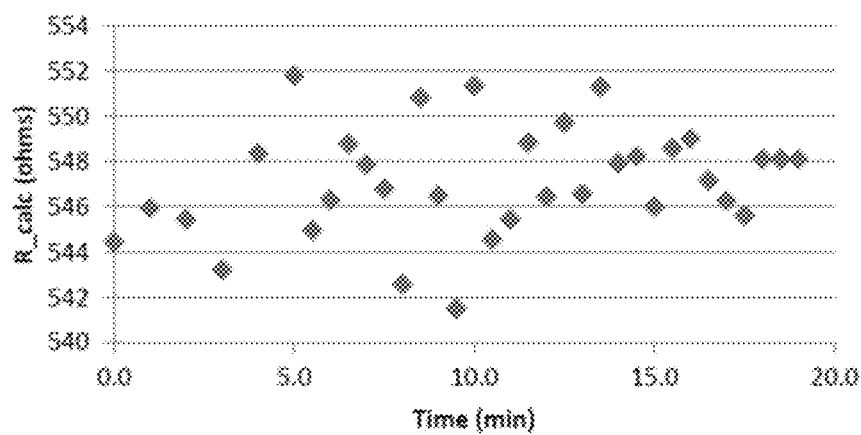
Figure 18C:
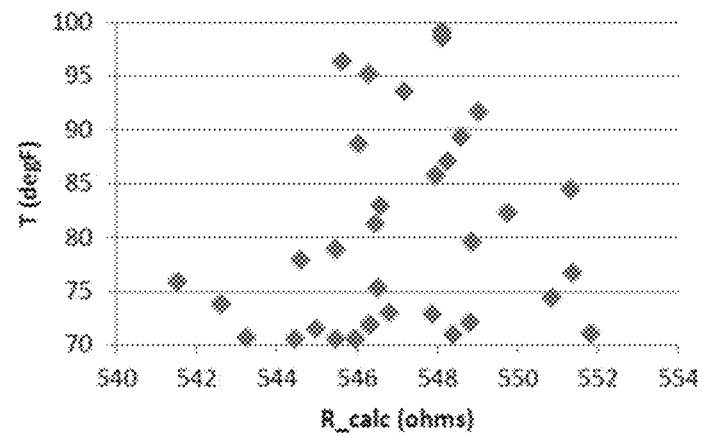

The temperature increases linearly with power until an equilibrium is reached (see FIG. 18A, about 2 watts of power and 100° F.). Moreover, the resistance is not observed to drift with time (FIG. 18B) or temperature (FIG. 18C) for resistive heaters printed using the inks and methods of the presently disclosed invention. Such results are observed uniformly from trace to trace, showing an overall deviation of only 3Ω.

According to certain aspects of the present invention, the resistive heaters may be configured to carry a power density of less than 400 watts/$m^2$, such as less than 300 watts/$m^2$. According to other aspects, the resistive heaters of the present invention may not be capable of carrying a power density of 400 watts/$m^2$, and may only be capable of carrying a power density of less than 400 watts/$m^2$, such as less than 350 watts/$m^2$, or less than 300 watts/$m^2$, or less than 200 watts/$m^2$, or even less than 100 watts/$m^2$.

A thermal output from the resistive heaters will depend on various design factors, such as the metal or alloy in the conductive ink, a width of the conductive trace, a thickness of the conductive trace, the resistance of the trace, and any other components in the ink composition (e.g., other conductive polymers, etc.), and thus may be tuned to fit the specific application.

Thus, according to certain aspects of the present invention, the resistive heaters may be configured to carry a power density of greater than 400 watts/$m^2$. For example, the resistive heaters of the present invention may be capable of carrying a power density of at least 600 watts/$m^2$, such as at least 800 watts/$m^2$, or at least 1,000 watts/$m^2$, or at least 1,500 watts/$m^2$.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

EXAMPLES

Production of a Particle-Free Conductive Ink

Exemplary conductive inks comprising silver complexes comprising a carboxylate second ligand (e.g., silver carboxylate) may be formed by reaction of a metal oxide or metal-acetate and a carboxylic acid in a reaction that affords analytically pure compounds and proceeds in quantitative yields.

As example, silver acetate was reacted with a carboxylic acid (isobutyrate and cyclopropate). The elemental analysis of the two silver complexes were C, 24.59; H, 3.72 and C, 24.68; H, 2.56 for the isobutyrate and cyclopropate, respectively. Theoretical values are C, 24.64; H, 3.62 and C, 24.90; H, 2.61 for the isobutyrate and cyclopropate, respectively.

Figure 9:
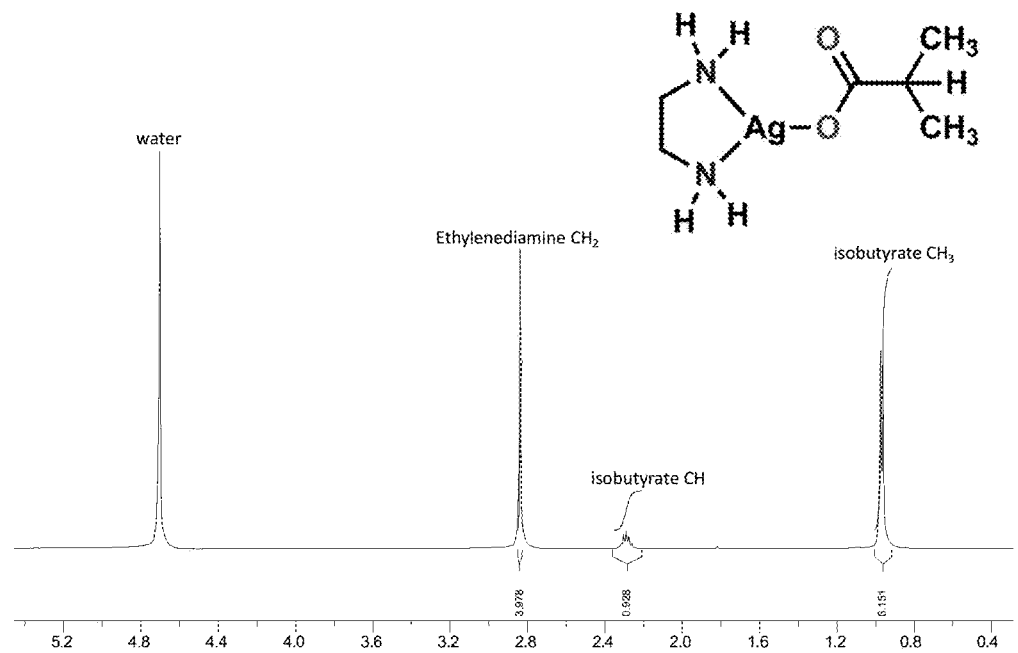
FIG. 9 shows a proton nuclear magnetic resonance ($^1$H-NMR) scan of an exemplary metal complex (ethylenediaminosilver(I) isobutyrate in $D_2O$) according to certain aspects of the presently disclosed invention, and (upper right) the structure of an exemplary conductive ink of the present invention.

The metal-second ligand salt was then reacted with an excess of the first ligand to form the metal complex. In a typical preparation, silver isobutyrate was prepared as described above, and placed in a 25 mL one-neck 14/20 round bottom flask containing a Teflon coated magnetic stir bar. To this was added 13 eq. ethylenediamine (amounts as shown in Table 1 below). The reaction proceeded for 2 h at room temperature with stirring, filtered to remove any particulates, and the unreacted ethylenediamine was removed by rotary evaporation at 40° C. to yield a white powder. Additional wash steps can be included. The isolated metal complex—ethylenediamine silver isobutyrate—was then dissolved to at least 100 mg/ml in a mixture of polar protic solvents (water, propylene glycol, and isopropanol) to form a particle-free conductive ink which is clear (see top right of FIG. 9, and Table 2 below).

TABLE 1

| Diamine Amount (ethylenediamine) | Silver (I) Carboxylate Amount (silver isobutyrate) | Yield |
| --- | --- | --- |
| 184 g, 3059 mmol, 13 equiv. | 46 g, 235 mmol, 1 equiv. | 59 g (99%) |

TABLE 2

| Isolated Metal Complex | Water | Propylene glycol | Isopropanol |
| --- | --- | --- | --- |
| 2.20 g (30%) | 3.08 g (42%) | 0.77 g (11%) | 1.25 g (17%) |

Purity of the Metal Complex

Preparation of the metal complexes was found to require an excess of the first ligand reactant with the metal-second ligand (see table above; 13-fold excess second ligand used to produce the metal complex). As example, most silver (I) carboxylates are insoluble in most conventional solvents. A 1:1 reaction (1:1 silver isobutyrate:ethylenediamine) gave a dark colored product with a large amount of insoluble material, presumably unreacted silver (I) isobutyrate, when formulated in a polar protic solvent system. Thus, the metal complexes formed by the 1:1 reaction likely failed to promote complete conversion of all reactants to products, and failed to form continuous conductive films on a substrate.

A 1:6 reaction (1:6 silver isobutyrate:ethylenediamine), on the other hand, formed crystals spontaneously from a filtered solution of the reaction. Moreover, while the metal complex did dissolve in the polar protic solvent system, the presence of excess unreacted diamine was found to have a significant impact on the density, viscosity, and surface tension of the ink formulations. The 1:6 product formulated as an ink shows poor sheet coverage and extremely high sheet resistance (>600,000Ω/□).

The 1:13 reaction product listed in the table above, which was purified to remove excess unreacted amine (first ligand) showed excellent sheet coverage, and demonstrated a sheet resistance of less than 1Ω/□. The purified product, dissolved in a polar protic solvent system as shown in the table above, showed a density of 1.12 g/mL, a viscosity of 8.55 cps, and a surface tension of 22.9 dyne/cm.

Accordingly, an important step in producing the particle-free conductive inks of the present invention is removal of any unreacted second ligand, especially in view of the large excess used to formulate the final metal complex. When purified as detailed above, the product (yield 99%) is colorless. Unpurified products, however, tend to be dark colored, which is likely associated with normal darkening of diamines when exposed to open air. In general, amines absorb moisture and carbon dioxide resulting in formation of unstable carbamates. Such speciation of amines may destabilize diaminosilver (I) carboxylates, which often results in premature silver metallization, dark coloration and particle formation. Hence, removal of any residual amines is important to promote stability of diaminosilver (I) carboxylates, especially if concomitant preparation of zero-particulate diaminosilver (I) carboxylate compositions is required.

Stoichiometric Ratio of Ligands and Metal in the Metal Complex

The metal complex was found to comprise stoichiometric amounts of the first and second ligands and the metal. Structural analysis using proton NMR showed that the ethylenediamine silver isobutyrate powder dissolved in $D_2O$ consists of stoichiometric amounts of the ethylenediamine ligand coordinated to silver isobutyrate. A $^1$H-NMR spectrum of the metal complex in $D_2O$ (see FIG. 9; $^1$H-NMR scan on a Bruker AV-360 spectrometer) showed the expected three proton-carbon (CH) peaks: 1 for the two ethylenediamine $CH_2$ groups (4 protons total), 1 for the single isobutyrate CH group (1 proton), and 1 for the two isobutyrate $CH_3$ groups (6 protons total). These were assigned as: 0.93 ppm isobutyrate $CH_3$, 2.25 ppm isobutyrate CH, and 2.81 ppm ethylenediamine $CH_2$. The proton integral ratio of 3.978 ethylenediamine $CH_2$:0.928 isobutyrate CH:6.151 isobutyrate $CH_3$ is consistent with 1 ethylenediamine:1 silver isobutyrate, or stoichiometric amounts of the metal, and each of the ethylenediamine and isobutyrate ligands.

In order to verify that the metal complex, when dissolved in two or more polar protic solvents to form the ink, maintains a stoichiometric ratio of the first and second ligands and the metal, further $^1$H-NMR experiments were performed for the metal complex dissolved in a mixture of three polar protic solvents as listed above (water, propylene glycol, isopropanol), and $D_2O$. The spectra in FIG. 10 shows well-resolved peaks for the various polar protic solvents as well as the metal complex (ethylenediamine silver (I) isobutyrate), which are assigned as: 0.93 ppm (doublet, isobutyrate $CH_3$), 2.25 ppm (septet, isobutyrate CH), and 2.81 ppm (singlet, ethylenediamine $CH_2$).

The strong similarity between the chemical shifts of the metal complex in the NMR solvent (FIG. 9) and in the composition comprising the metal complex and two or more polar protic solvents (FIG. 10) suggests excellent compatibility between the metal complex and the polar protic solvent system. The ethylenediamine silver (I) isobutyrate proton ratios of 4.098 ethylenediamine $CH_2$:0.944 isobutyrate CH:6.446 isobutyrate $CH_3$ are in good agreement with theoretical ratios of 4 ethylenediamine $CH_2$:1 isobutyrate CH:6 isobutyrate $CH_3$; which demonstrates that dissolving the metal complex in a polar protic solvent carrier does not impact the coordination environment around the metal (i.e., silver). This result further corroborates the fact that the chemical composition of the metal complex remains unchanged when dissolved to form the ink composition (i.e., stoichiometry remains unchanged).

Formulation of Particle-Free Conductive Inks

Various polar protic solvents systems were tested to demonstrate the flexibility of the solvent choice for formulation of the particle-free conductive inks of the present invention (see Tables 3 and 4 below). For example, a diamine silver (I) isobutyrate complex was formulated in solvent systems comprising at least two polar protic solvents. Representative ink formulations using different combinations of polar protic solvents, and data showing that the ink formulations produce continuous, highly conductive films (sheet resistance of 0.04-0.09Ω/□) when formulated in the polar protic solvents are shown in Tables 3 and 4 below.

TABLE 3

Metal Complex Formulated in Polar Protic Solvent Systems

| composition | metal complex | water | Glycol ethylene glycol | Glycol propylene glycol | Glycol ether (dowanol) | Alcohol ethanol | Alcohol isopropanol |
|---|---|---|---|---|---|---|---|
| A | 2.20 g | 3.08 g | — | 0.77 g | — | — | 1.25 g |
| B | 2.01 g | — | — | 0.77 g | — | — | 4.25 g |
| C | 2.03 g | 4.27 g | — | 0.78 g | — | — | — |
| D | 2.03 g | 4.26 g | 0.75 g | — | — | — | — |
| E | 2.00 g | 3.00 g | — | 0.27 g | — | — | 1.75 g |
| F | 2.01 g | 3.07 g | — | 0.13 g | — | — | 1.91 g |
| G | 2.00 g | 3.06 g | — | 1.5 g | — | — | 0.51 g |
| H | 2.00 g | 3.02 g | 0.75 g | — | — | — | 1.26 g |
| I | 2.02 g | 3.03 g | — | 0.76 g | — | 1.26 g | — |
| J | 2.04 g | 3.03 g | — | 0.76 g | 1.26 g | — | — |
| K | 2.09 g | 3.01 g | — | 0.51 g | 0.76 g | — | 0.76 g |

TABLE 4

| composition | Density (g/mL) | Viscosity (cP) | Surface Tension (dyne/cm) | Sheet Resistance (Ω/□) |
|---|---|---|---|---|
| A | 1.12 | 8.55 | 22.9 | 0.05 |
| B | 0.937 | 10.8 | 23.3 | 0.04 |
| C | 1.15 | 4.60 | 25.3 | 0.08 |
| D | 1.15 | 3.77 | 24.7 | 0.08-0.09 |
| E | 1.09 | 6.99 | 23.6 | 0.06 |
| F | 1.08 | 6.71 | 22.7 | 0.06 |
| G | 1.14 | 8.83 | 23.3 | 0.05 |
| H | 1.11 | 7.02 | 23.5 | 0.08 |
| I | 1.11 | 21.3 | 23.8 | 0.06 |
| J | 1.14 | 8.25 | 23.5 | 0.9-01 |
| K | 1.12 | 8.21 | 22.7 | 005-0.06 |

Washability of Particle-Free Conductive Inks

The particle-free conductive inks of the presently disclosed invention were printed on various textiles to form conductive traces using ink jet printing methods as disclosed hereinabove. The trace remained uncoated, or was coated with a transparent UV curable polyurethane coating. Sheet resistance for these patterns was tested according to AATCC 61-2013 (laundering). As shown in FIG. 11, very little change in the conductivity for the traces was observed after up to 50 washes. The coated trace shows good conductivity after as many as 100 wash cycles, while the native (uncoated) traces showed good conductivity after as many as 70 wash cycles. The control samples completely lost conductivity after only 5 wash cycles.

Analysis of various textiles according to AATCC 61-2013 demonstrated that a conductive trace comprising 8 layers of printed ink showed less than a 3Ω increase in resistance after 100 wash cycles. When an abrasion resistant coating was included over the trace, the resistance only increased by less than 0.7Ω.

Strain Resistance

Figure 12:
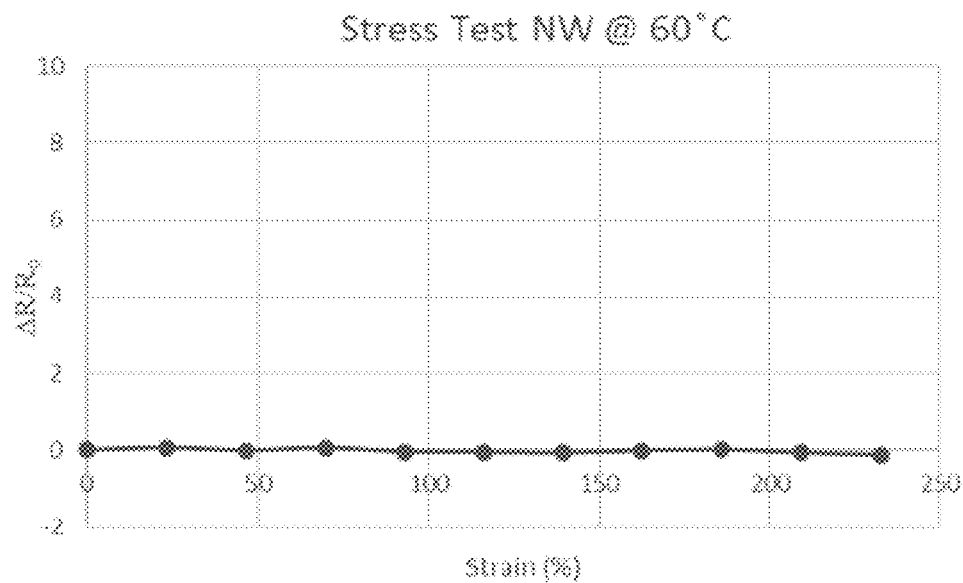
FIG. 12 shows a graph of the change in resistance with increased strain (stretch) for a conductive trace on a textile using inks and methods in accordance with certain aspects of the presently disclosed invention.

Woven fabrics were printed using inks and methods according to the presently disclosed invention, and subjected to strain resistance measurements. Shown in FIG. 12 are results for electromechanical stretch testing under various amounts of stretching (0% to 230%). For conductive traces of the prior art, strain induces film cracking which reduces conductivity (see FIG. 5). Using inks and methods according to the present invention, the trace conductivity was little affected by the increased strain until the breakpoint of the textile (i.e., textile rips into two pieces). This unusual behavior is demonstrated by a very slight increase in the average spot temperature of the trace (as measured using FLIR; data not shown), where the spot temperature correlates to the amount of heat generated when electrons flow through a stretched conductive fabric; the higher the temperature, the more heated generated by the flowing electrons.

Bendability of the printed traces was also tested, as shown in FIG. 13, and only a small loss of conductivity (<10%) was observed for bending of a conductive trace printed on woven textiles using inks and methods of the present invention (10,000× bends in the trace; tested according to ASTM D522—Mandel Bend Test). Nonwoven textiles showed reduced performance after 1,300 bends, which is likely a function of breakdown of the textile and not the conductive trace.

Abrasion Resistance

A woven substrate was printed with a conductive ink according to the present invention, and coated with an ablation resistance coating (Ablative Resistant Coating NSN 8030-00-164-4389) or left uncoated. Sheet resistance was measured for several textile samples after coating (control), 10×, 20×, and 30× rubbing (see Table 5).

TABLE 5

| | Resistance Ω | | | | |
|---|---|---|---|---|---|
| Sample | Before coating | After coating | After rubbing 10X | After rubbing 20X | After rubbing 30X |
| Uncoated | 6-8 | — | 62-101 | 132-138 | 300-382 |
| Coated | 6-8 | 6-7 | 9-10 | 11-12 | 12-13 |

The following aspects are disclosed in this application:

Aspect 1: A method for forming an e-textile, the method comprising: depositing a particle-free conductive ink on a textile substrate to form at least one pattern, wherein the particle-free conductive ink conformally coats fibers of the textile; and curing the particle-free conductive ink in the at least one pattern to form at least one conductive pattern, wherein the at least one conductive pattern exhibits an ink bleed of less than 0.5 mm, and a resistance of less than 10Ω/□.

Aspect 2: The method according to Aspect 1, wherein depositing the particle-free conductive ink is by inkjet printing on the textile substrate that is heated to a temperature of about 30° C. to about 90° C., such as about 40° C. to about 80° C.

Aspect 3: The method according to Aspect 2, wherein depositing the particle-free conductive ink by inkjet printing comprises printing two or more layers.

Aspect 4: The method according to any one of Aspects 1 to 3, further comprising, during depositing the particle-free conductive ink: heating the textile substrate to a temperature of about 30° C. to about 90° C., such as about 40° C. to about 80° C.

Aspect 5: The method according to any one of Aspects 1 to 4, wherein the at least one conductive pattern exhibits an ink bleed of less than 0.2 mm.

Aspect 6: The method according to any one of Aspects 1 to 5, wherein the at least one conductive pattern exhibits a resistance of less than 5Ω/□, such as less than 1Ω/□.

Aspect 7: The method according to any one of Aspects 1 to 6, further comprising, after curing the particle-free conductive ink: coating at least a portion of the conductive pattern with a protective dielectric coating.

Aspect 8: The method according to any one of Aspects 1 to 7, wherein the curing is by heating at a temperature of less than 200° C. for a time of less than 20 minutes, exposure to 2-20 pulses of pulsed light, exposure to infrared radiation, or any combination thereof.

Aspect 9: The method according to any one of Aspects 1 to 8, wherein the textile substrate is pretreated with oxygen plasma, a protective coating, or both.

Aspect 10: The method according to any one of Aspects 1 to 9, wherein the particle-free conductive ink comprises: at least one metal complex comprising: at least one metal, at least one first ligand which is a sigma donor to the metal and volatilizes upon heating the metal complex, and at least one second ligand, which is different from the first ligand and also volatilizes upon heating the metal complex; and one or more polar protic solvents, wherein the metal complex has a solubility measured at 25° C. of at least 250 mg/ml in the one or more polar protic solvents, and wherein the at least one metal, the at least one first ligand, and the at least one second ligand are provided in stoichiometric amounts in the conductive ink.

Aspect 11: The method according to Aspect 10, wherein the one or more polar protic solvents comprise one or more of water, an alcohol, and an amine.

Aspect 12: The method according to Aspects 10 or 11, wherein the metal complex has a solubility measured at 25° C. of at least 500 mg/ml in the one or more polar protic solvents.

Aspect 13: The method according to any one of Aspects 1 to 12, wherein the particle-free conductive ink comprises from 0.1% to 5% of an additive selected from one or more of a binder, a surfactant, a dispersant, and a dye.

Aspect 14: The method according to any one of Aspects 1 to 13, wherein the particle-free conductive ink has a viscosity measured at 25° C. of 25 cps or less, such as 20 cps or less.

Aspect 15: The method according to any one of Aspects 1 to 14, wherein the textile comprises a knit, woven, or nonwoven fabric comprising fibers of polyester, polyamides, spandex, nylon, Evolon®, elastane, cotton, cellulose, silk, wood, wool, or blends thereof.

Aspect 16: An e-textile produced by any one of the methods of Aspects 1-15, wherein the e-textile functions as a sensor, an electrode, a circuit, an interconnect, a light, an antenna, a resistive heating element, a switch, a battery, or any combination thereof.

Aspect 17: An e-textile comprising: a textile having at least one particle-free conductive trace printed thereon, wherein at least a portion of the at least one particle-free conductive trace is over-coated with a protective dielectric coating, wherein the at least one particle-free conductive trace exhibits an ink bleed of less than 0.5 mm, and a resistance of less than 10Ω/□.

Aspect 18: The method according to Aspect 17, wherein the at least one conductive trace exhibits an ink bleed of less than 0.2 mm.

Aspect 19: The method according to any one of Aspects 17 or 18, wherein the at least one conductive trace exhibits a resistance of less than 5Ω/□, such as less than 1Ω/□.

Aspect 20: The e-textile according to any one of Aspects 17 to 19, wherein the particle-free conductive trace comprises two or more layers of a particle-free conductive ink.

Aspect 21: The e-textile according to any one of Aspects 17 to 20, wherein the textile comprises cellulose or cotton-based fibers, and the textile is pretreated with a protective coating.

Aspect 22: The e-textile according to any one of Aspects 17-21, wherein the resistance in the conductive trace is increased by less than 50% after the textile is exposed to 50 wash cycles, such as less than 50% after 100 washed, or less than 30% after 100 washes.

Aspect 23: The e-textile according to any one of Aspects 17-22, wherein the textile comprises a knit, woven, or nonwoven fabric comprising fibers of polyester, polyamides, spandex, nylon, Evolon®, elastane, cotton, cellulose, silk, wood, wool, or blends thereof.

Aspect 24: A resistive heater comprising: a textile having at least one particle-free conductive pattern printed thereon, wherein at least a portion of the particle-free conductive pattern is over-coated with a protective dielectric coating, wherein the resistive heater heats at a rate of about 0.7° C./second to about 1° C./second, and wherein resistance in the conductive trace is increased by less than 50% after the textile is exposed to 50 wash cycles.

Aspect 25: The resistive heater of Aspect 24, wherein the textile comprises a knit, woven, or nonwoven fabric comprising fibers of polyester, polyamides, spandex, nylon, Evolon®, elastane, cotton, cellulose, silk, wood, wool, or blends thereof.

What is claimed is:

1. A method for forming an e-textile, the method comprising:
   depositing a particle-free conductive ink on a textile substrate to form at least one pattern, wherein the particle-free conductive ink conformally coats fibers of the textile; and
   curing the particle-free conductive ink in the at least one pattern to form at least one conductive pattern,
   wherein during depositing the particle-free conductive ink, the textile substrate is heated to a temperature of about 30° C. to about 90° C.,
   wherein the at least one conductive pattern exhibits an ink bleed of less than 0.5 mm and a resistance of less than 10Ω/□,
   wherein the ink bleed is measured as a distance from an intended border of a printed trace that the particle-free conductive ink may extend.

2. The method of claim 1, wherein the conductive pattern exhibits an ink bleed of less than 0.2 mm, and a resistance of less than 1Ω/□.

3. The method of claim 1, wherein depositing the particle-free conductive ink is by inkjet printing on the textile substrate that is heated to a temperature of about 40° C. to about 80° C.

4. The method of claim 2, wherein depositing the particle-free conductive ink by inkjet printing comprises printing two or more layers.

5. The method of claim 1, wherein the textile substrate is heated to a temperature of about 40° C. to about 80° C.

6. The method of claim 5, wherein the at least one conductive pattern exhibits an ink bleed of less than 0.2 mm.

7. The method of claim 1, further comprising, after curing the particle-free conductive ink:
coating at least a portion of the conductive pattern with a protective dielectric coating.

8. The method of claim 1, wherein the curing is by heating at a temperature of less than 200° C. for a time of less than 20 minutes, exposure to 2-20 pulses of pulsed light, exposure to infrared radiation, or any combination thereof.

9. The method of claim 1, wherein the textile substrate is pretreated with oxygen plasma, corona, a protective coating, or a combination thereof.

10. The method of claim 1, wherein the particle-free conductive ink comprises:
at least one metal complex comprising:
at least one metal,
at least one first ligand which is a sigma donor to the metal and volatilizes upon heating the metal complex, and
at least one second ligand, which is different from the first ligand and also volatilizes upon heating the metal complex; and
one or more polar protic solvents,
wherein the metal complex has a solubility measured at 25° C. of at least 250 mg/ml in the one or more polar protic solvents, and
wherein the at least one metal, the at least one first ligand, and the at least one second ligand are provided in stoichiometric amounts in the conductive ink.

11. The method of claim 10, wherein the one or more polar protic solvents comprise one or more of water, an alcohol, an amine, an amino alcohol, and a polyol.

12. The method of claim 10, wherein the particle-free conductive ink comprises from 0.1% to 5% of an additive selected from one or more of a binder, a surfactant, a dispersant, and a dye.

13. The method of claim 10, wherein the particle-free conductive ink has a viscosity measured at 25° C. of 25 cps or less, such as 20 cps or less.

14. The method of claim 1, wherein the textile comprises a knit, woven, or nonwoven fabric comprising fibers of polyester, polyamides, spandex, nylon, Evolon®, elastane, cotton, cellulose, silk, wood, wool, or blends thereof.

15. An e-textile produced by the method of claim 1, wherein the e-textile functions as a sensor, an electrode, a circuit, an interconnect, a light, an antenna, a resistive heating element, a switch, a battery, or any combination thereof.

16. An e-textile comprising:
a textile having at least one conductive trace printed thereon, wherein the conductive trace is printed with a particle-free conductive ink that conformally coats fibers of the textile,
wherein at least a portion of the at least one conductive trace is over-coated with a protective dielectric coating,
wherein the at least one conductive pattern exhibits an ink bleed of less than 0.5 mm, and a resistance of less than 10Ω/□, and
wherein the textile comprises a knit, woven, or nonwoven fabric comprising fibers of polyester, polyamides, spandex, nylon, Evolon®, elastane, cotton, cellulose, silk, wood, wool, or blends thereof.

17. The e-textile of claim 16, wherein the at least one conductive trace comprises two or more layers of a particle-free conductive ink.

18. The e-textile of claim 16, wherein the at least one conductive trace exhibits an ink bleed of less than 0.2 mm, and a resistance of less than 1Ω/□.

19. The e-textile of claim 16, wherein the resistance in the conductive trace is increased by less than 50% after the textile is exposed to 50 wash cycles.

20. A resistive heater comprising:
a textile having at least one conductive pattern printed thereon, wherein the conductive pattern is printed with a particle-free conductive ink that conformally coats fibers of the textile,
wherein at least a portion of the particle-free conductive pattern is over-coated with a protective dielectric coating,
wherein the resistive heater heats at a rate of about 0.7° C./second to about 1° C./second, and
wherein resistance in the conductive trace is increased by less than 50% after the textile is exposed to 50 wash cycles.

21. The resistive heater of claim 20, wherein the textile comprises a knit, woven, or nonwoven fabric comprising fibers of polyester, polyamides, spandex, nylon, Evolon®, elastane, cotton, cellulose, silk, wood, wool, or blends thereof.

* * * * *